United States Patent [19]

Hamane et al.

[11] 4,296,543
[45] Oct. 27, 1981

[54] METHOD OF AND APPARATUS FOR FABRICATING STATOR ASSEMBLIES OF ELECTRICAL MACHINES

[75] Inventors: Tokuhito Hamane, Hirakata; Toshio Kinoshita, Katano; Masafumi Kihira, Osaka, all of Japan

[73] Assignee: Matsushita Electric Industrial Co., Ltd., Osaka, Japan

[21] Appl. No.: 43,027

[22] Filed: May 29, 1979

[30] Foreign Application Priority Data

May 30, 1978 [JP] Japan .................................. 53-65209

[51] Int. Cl.$^3$ ........................................... H02K 15/06
[52] U.S. Cl. ......................................... 29/596; 29/736
[58] Field of Search ................. 29/596, 606, 732, 734, 29/736, 564.1, 564.6

[56] References Cited

U.S. PATENT DOCUMENTS

| | | | |
|---|---|---|---|
| 3,691,606 | 9/1972 | Muskulus | 29/732 |
| 3,742,596 | 7/1973 | Smith et al. | 29/596 |
| 4,090,290 | 5/1978 | Clark | 29/596 |
| 4,106,185 | 8/1978 | Lauer | 29/592 |
| 4,151,636 | 5/1979 | Lauer et al. | 29/596 |
| 4,186,478 | 2/1980 | Hamane et al. | 29/596 |

Primary Examiner—Carl E. Hall
Attorney, Agent, or Firm—Spencer & Kaye

[57] ABSTRACT

A method for fabricating stator assemblies of electrical machines and an apparatus suitable for carrying the method into practice, wherein a plurality of transfer tools receiving wound coils and inserting the coils into stator cores are transported by conveyors in two identical closed paths arranged symmetrically. Located along each closed path are a plurality of main coil winding devices for winding main coils and transferring them to the transfer tools, a plurality of auxiliary coil winding devices for winding auxiliary coils and transferring these coils to the transfer tools, and a transfer tool indexing device interposed between the main coil winding devices and the auxiliary coil winding devices for indexing the auxiliary coils with the main coils. A drawing-in device common to the two closed paths simultaneously draws the main and auxiliary coils on each transfer tool into stator grooves. The main coils wound by one of the main coil winding devices and the auxiliary coils wound by one of the auxiliary coil winding devices are successively transferred to each transfer tool while the latter moves in each closed path. The coils are simultaneously drawn into the stator grooves by the drawing-in device in one operation.

10 Claims, 42 Drawing Figures

F I G. 17
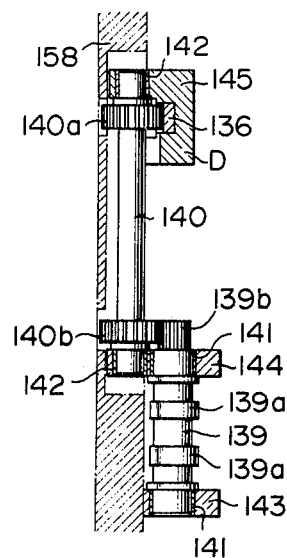
F I G. 18
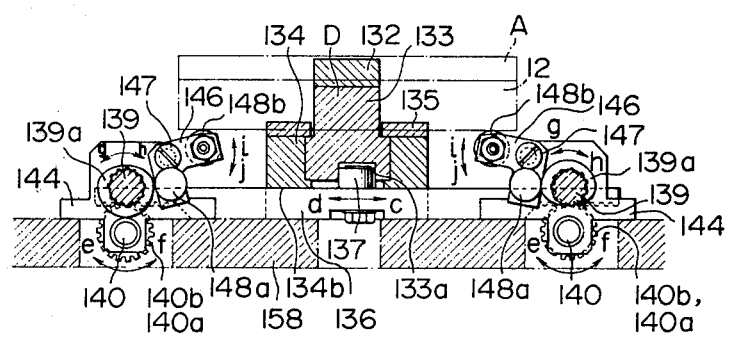

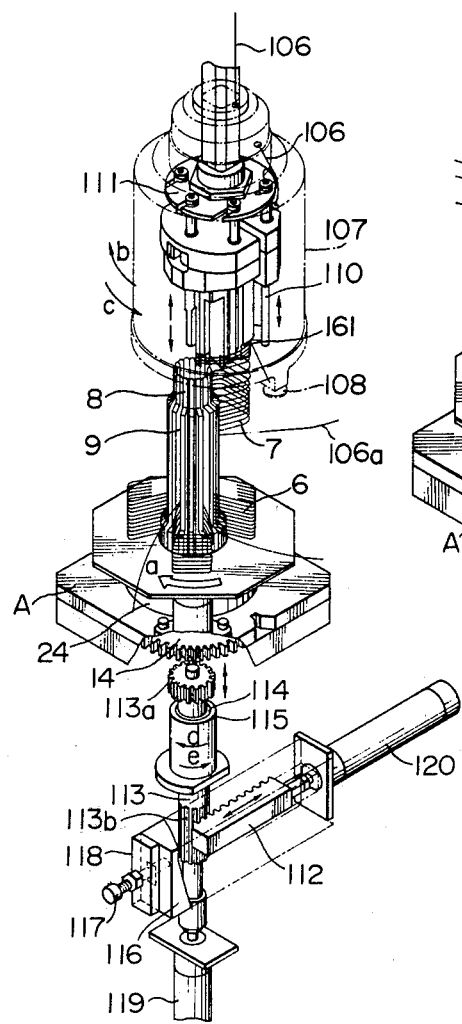
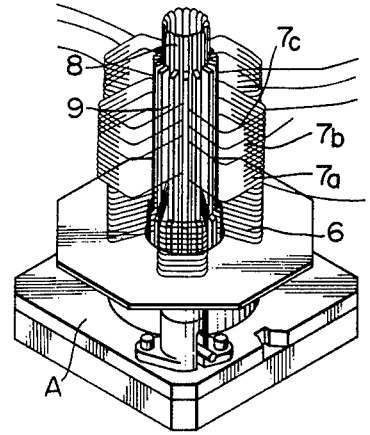
FIG. 23
FIG. 24

METHOD OF AND APPARATUS FOR FABRICATING STATOR ASSEMBLIES OF ELECTRICAL MACHINES

FIELD OF THE INVENTION

This invention relates to methods of and apparatus for fabricating stator assemblies of electrical machines, and more particularly it deals with a method of and an apparatus for fabricating stator assemblies of electrical machines wherein coils to be inserted in the grooves formed in stator cores are automatically inserted into the grooves in the stator cores through the agency of transfer tools.

OBJECT OF THE INVENTION

The object of this invention is to provide a method of and an apparatus for fabricating stator assemblies wherein different types of coils, such as main coils and auxiliary coils, are wound in separate steps, successively transferred to a transfer tool, and simultaneously inserted into the stator core in one operation.

The method and apparatus according to the present invention are suitable for producing electrical machines with small variations on a mass production basis. The invention can achieve full automation of the production line and increased efficiency in fabricating stator assemblies.

Other and additional objects, features and advantages of the invention will become apparent from the following description in connection with the accompanying drawings.

BRIEF DESCRIPTION OF THE DRAWINGS

FIG. 17 is a fragmentary sectional view taken along the line XVII—XVII in FIG. 16;

FIG. 18 is a fragmentary sectional view taken along the lines XVIII—XVIII in FIG. 16;

FIG. 23 is a perspective view showing the manner in which the auxiliary coils are wound by the auxiliary coil winding device and transferred to the transfer tool;

FIG. 24 is a perspective view of the transfer tool having transferred thereto auxiliary coils of all the poles wound by the auxiliary coil winding device;

DETAILED DESCRIPTION OF THE INVENTION

Description of the Prior Art

Figure 42:
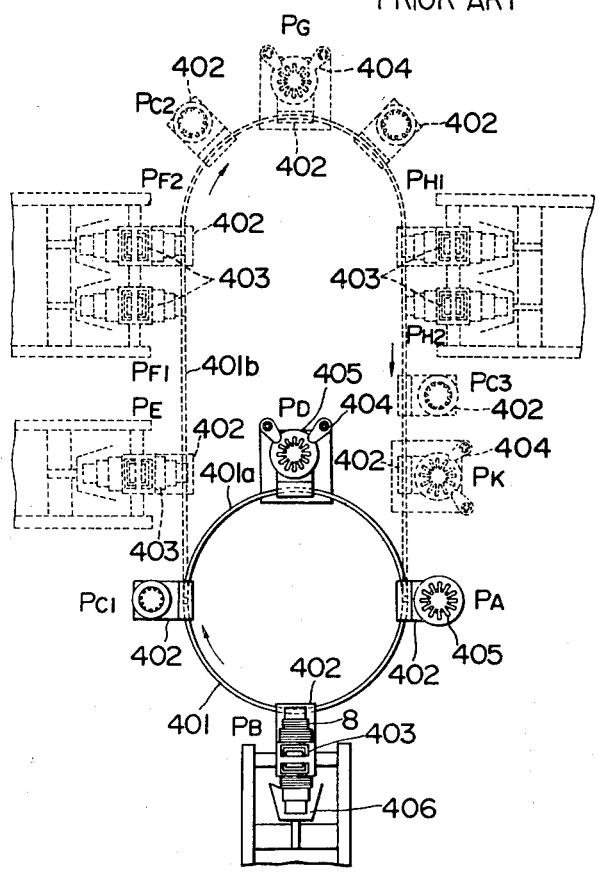
FIG. 42 is a plan view showing a system for fabricating stator assemblies of electrical machines of the prior art.

An apparatus for fabricating stator assemblies of electrical machines of the prior art is disclosed, for example, in U.S. Pat. No. 3,691,606. The apparatus is shown in FIG. 42, wherein 401 designates a guide rail including a curved rail 401a and a straight rail 401b forming a closed path. 402 designates transport carriages movable along the guide rail 401 between various stations located along guide rail 401 and capable of stopping at each station. 403 designates coil winding device, and 404 designates drawing-in devices. Each transport carriage 402 has a transfer tool 405 thereon.

In the operation of the apparatus constructed as aforesaid, the transport carriage 402 shown on the right side at station PA carries a completely wound stator core supported on the transfer tool 405. The stator core is lifted off the transport tool 405. The transport carriage 402 having the empty transfer tool 405 then moves along guide rail 401 to a winding station PB, at which is located a winding device 403. At station PB, coils of two poles wound previously by the coil winding device 403 onto templates 406 are simultaneously transferred to the transfer tool 405. Thereafter, the transport carriage 402 moves to a stator core placing station $PC_1$, where a stator core is placed onto the upper end of the transfer tool 405. After the stator core has been placed onto the transfer tool 405, the transport carriage 402 moves to a drawing-in station PD, where the coils are drawn into the stator core by a drawing-in device 404. The transport carriage 402 then moves to the initial station PA.

Operation of the devices arranged along a broken line will now be described. Coil winding stations PB, PE, $PF_1$, $PF_2$, $PH_1$ and $PH_2$ have coil winding devices for winding various different types of coils. In fabricating stator assemblies, the stations can be divided into two groups: one includes stations PB, PE, $PF_1$, $PF_2$, $PC_2$ and PG and the other includes stations $PH_1$, $PH_2$, $PC_3$ and PK. These two groups of stations can operate independently of each other. Coil winding stations $PF_1$ and $PF_2$ operate in parallel and coil winding stations $PH_1$ and $PH_2$ operate in parallel to wind the same type of coils. In this type of fabrication of stator assemblies, the end can be attained by winding main coils and transferring same to stator cores at stations PB, $PC_2$ and PG, and by winding auxiliary coils and transferring same to the stator cores at stations $PH_1$, $PH_2$, $PC_3$ and PK, for example. However, some disadvantages are associated with this apparatus. The disadvantages are as follows:

(1) In this apparatus, it is possible to carry out operations for winding main coils and auxiliary coils and inserting same into a stator core. However, lack of means for indexing the transfer tool and the arrangement whereby the main coils and the auxiliary coils are inserted in the same stator coil at separate stations make it impossible to simultaneously insert the main coils and the auxiliary coils in the stator core in one operation.

(2) When the main coils and the auxiliary coils are wound and drawn in a stator core by this apparatus, it is necessary to remove the stator core having the main coils drawn therein from the transfer tool before the transport carriage is moved to auxiliary coil winding stations $PH_1$ and $PH_2$. The stator core thus removed must be transported to the stator core placing station $PC_3$ disposed posterior to the auxiliary coil winding stations $PH_1$ and $PH_2$, in order to place the stator core again onto the transfer tool.

(3) Since the apparatus includes a plurality of winding device arranged in series in a closed path, the apparatus as a whole must be shut down when one winding device is rendered inoperative due to failure, adjustments or replacements of wires for winding coils of different types.

(4) Each transport carriage has a built-in drive for moving the transport carriage along the guide rail. This increases the production cost of the apparatus.

(5) Once the number of coil winding devices mounted in the apparatus is set, it is impossible to increase the number of coil winding devices.

DESCRIPTION OF THE PREFERRED EMBODIMENT

A preferred embodiment of the present invention will now be described by referring to the accompanying drawings.

Figure 1:
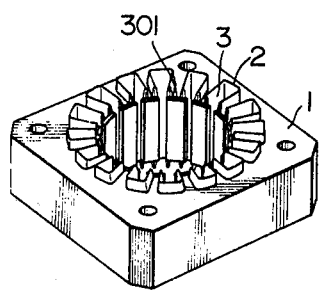
FIG. 1 is a perspective view of a stator body used in the present invention.
Figure 2:
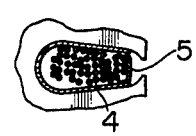
FIG. 2 is a sectional view of a groove formed in the stator body in which coils and an insulating piece are inserted by the method according to the present invention.

FIG. 1, a stator core 1 is formed with grooves 3 insulated by insulating paper 2. As shown in FIG. 2 each groove 3 has inserted therein coils 4 and an insulating piece 5.

Figure 3:
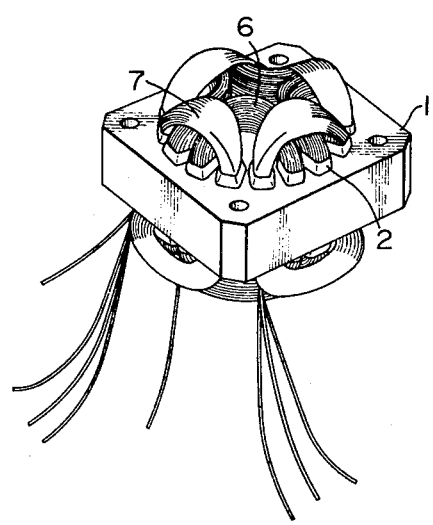
FIG. 3 is a perspective view of a stator assembly fabricated by the method according to the present invention, showing the external appearance of the stator assembly.

FIG. 3 shows a stator assembly having main coils 6 and auxiliary coils 7 drawn into the grooves 3, the auxiliary coils 7 including one or a plurality of groups of speed regulation coils if necessary.

Figure 4:
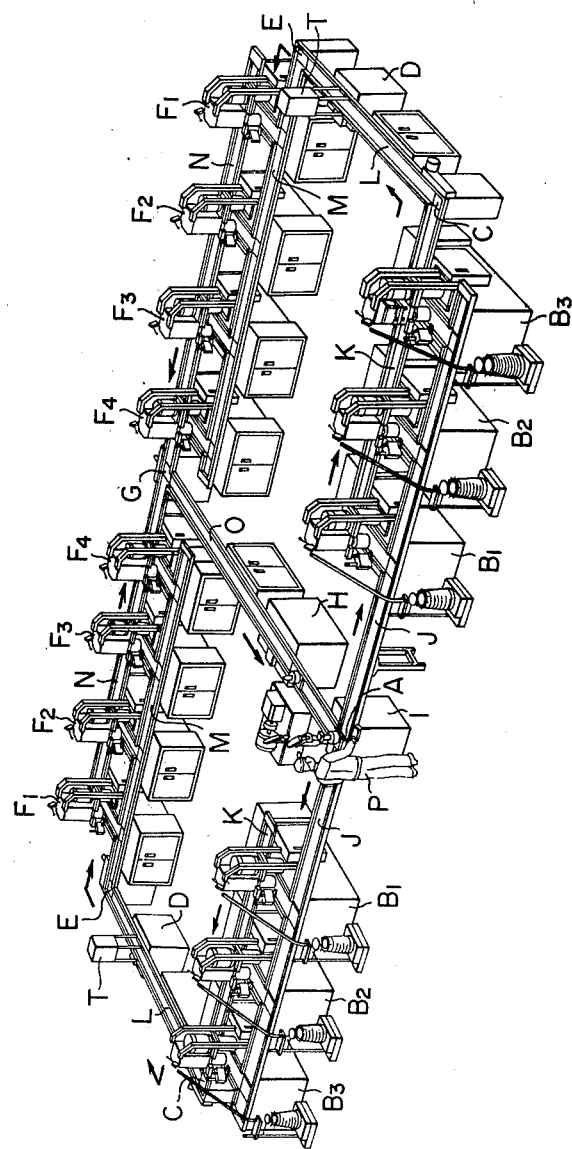
FIG. 4 is a perspective view of one embodiment of the present invention, showing the general arrangement of various devices.

The overall construction of the apparatus according to the present invention will be described by referring to FIG. 4. As can be clearly seen in this figure, various devices of the apparatus are arranged symmetrically on the left and right sides in this embodiment. An assembly line on the left side of FIG. 4 and an assembly line on the right side thereof have the same function. Reference mark A designates a transfer tool which is transported along a guide track in the direction of the arrows. $B_1$ to $B_3$ designate main coil winding devices arranged in parallel with one another, each device winding main coils and transferring the same to the transfer tool A. Reference mark C designates a device for changing the direction of movement of the transfer tool A operative to cause the transfer tool A having main coils thereon to turn through 90 degrees; D, a transfer tool indexing device operative to index the main coils on the transfer tool from the device C to a predetermined position and at the same time to urge the main coils deep into a space defined by a blade which will be described hereinafter. E, a device for changing the direction of movement of the transfer tool A operative to cause the transfer tool A from the indexing device D to turn through 90 degrees; $F_1$ to $F_4$, auxiliary coil winding devices arranged in parallel with one another each winding auxiliary coils and transferring the same to the transfer tool A from the device E, the auxiliary coils including one or a plurality of groups of speed regulation coils if necessary; G, a device for alternately advancing the coil-laden transfer tools received from the auxiliary coil winding devices on the left and right assembly lines to an insulator inserting device which will be described; H, the insulator inserting device for inserting insulating pieces into the lower end of the transfer tool sent from the device G; I, a drawing-in device where an empty stator core and a blade position setter which will be described, are combined with the transfer tool A received from the device H, for inserting the main coils, auxiliary coils including a plurality of groups of speed regulation coils and insulating pieces into the stator core in one operation; J, K, L, M, N and O, conveyors connecting the aforesaid various devices together for moving the transfer tools A along the guide track. Reference mark P designates an operator who supplies a stator core to each transfer tool A and lifts the completely wound stator core or a stator assembly from the transfer tool A and also operates the drawing-in device I.

The order in which the transfer tools A are moved to the main coil winding devices $B_1$, $B_2$ and $B_3$ and the auxiliary coil winding devices $F_1$, $F_2$, $F_3$ and $F_4$, will now be described by referring to FIG. 4.

Each of the transfer tools A transported by the conveyor J is received in one of the main coil winding devices $B_1$, $B_2$ and $B_3$ which is in the stand-by state. When all the main coil winding devices $B_1$ to $B_3$ are in the stand-by state, the transfer tools A are each received by a main coil winding device in the order of preference $B_1 \rightarrow B_2 \rightarrow B_3$. When all the main coil winding devices $B_1$ to $B_3$ are in operation, the transfer tools A transported successively by the conveyor J are each moved to the waiting station for the transfer devices which will be described, and which are arranged for the main coil winding devices, in the order of preference $B_3 \rightarrow B_2 \rightarrow B_1$ so as to wait until it is time for them to be worked.

The transfer tools A transported by conveyor M is moved to one of the auxiliary coil winding devices $F_1$ to $F_4$ which are in the stand-by state. When all the auxiliary coil winding devices $F_1$ to $F_4$ are in the stand-by state, the transfer tools A are each received by an auxiliary coil winding device in the order of preference $F_1 \rightarrow F_2 \rightarrow F_3 \rightarrow F_4$. When all the auxiliary coil winding devices $F_1$ to $F_4$ are in operation, the transfer tools A transported successively by the conveyor M are each moved to the waiting station for the transfer devices which will be described, and which are arranged for the auxiliary coil winding devices in the order of preference $F_4 \rightarrow F_3 \rightarrow F_2 \rightarrow F_1$ so as to wait until it is time for them to be worked.

The construction and operation of each of the component devices according to the present invention will be described hereinafter.

Figure 5:
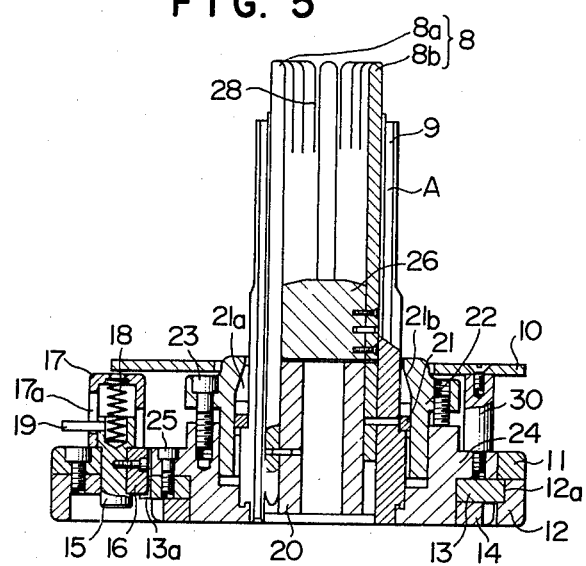
FIG. 5 is a front sectional view of the transfer tool.
Figure 6:
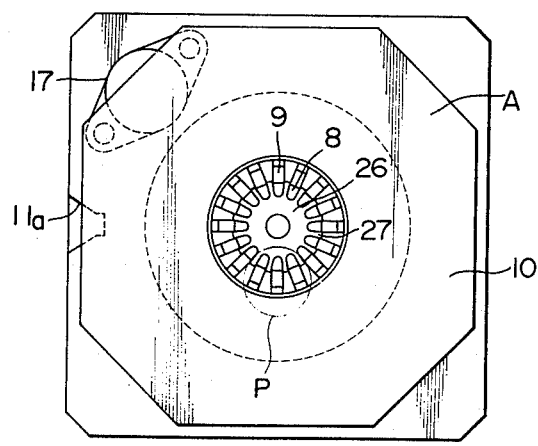
FIG. 6 is a top plan view of the transfer tool shown in FIG. 5.
Figure 7:
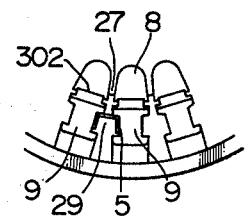
FIG. 7 is a view, on an enlarged scale, of a portion P of FIG. 5.
Figure 8:
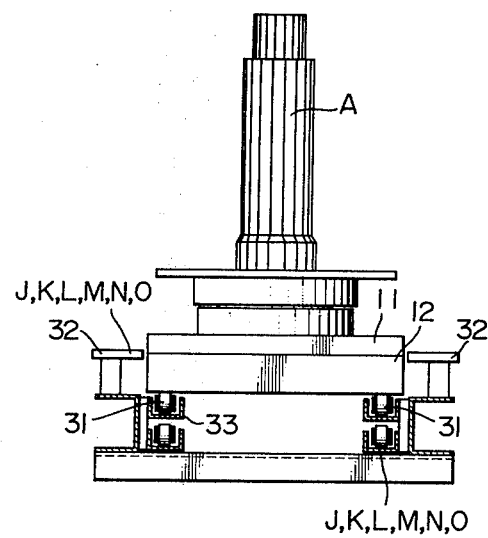
FIG. 8 is a sectional view of the conveyor, showing the manner in which the transfer tool shown in FIG. 5 is transported by the conveyor.

The construction of the transfer tool A will be described first by referring to FIGS. 5 to 7. Reference numeral 8 designates blades; 9, insulator guides and 10 a coil receiving plate; 11 and 12, an upper pallet and a lower pallet respectively to which the blades 8 and insulator guides 9 are rotatably supported in the arrangement described hereinunder, 13, a disk rotatably supported in a recess 12a formed in the lower pallet 12; 14, a gear secured to disk 13; 15, an indexing pin having secured thereto a key 16 fitted in a keyway 13a formed in the disk 13; 17, a case secured to upper pallet 11 for slidably supporting the indexing pin 15; 18, a compression spring for urging the indexing pin 15 against the upper pallet 11; 19, a pin secured to the indexing pin 15 and guided by a groove 17a formed in the case 17 for preventing the indexing pin 15 from rotating; 20, a blade position setting block for maintaining the plurality of blades 8 equidistantly from one another circumferentially; 21, a collet fitted over the outer peripheries of insulator guides 9 which is formed with axial grooves 21a, and having a tapered upper end portion 21b; 22, a pressing ring fitted over the tapered upper end portion 21b of collect 21. By clamping pressing ring 22 against a flange 24 by means of bolts 23, it is possible to reduce the diameter of the collet 21 to thereby urge the insulator guides 9 and the blades 8 against the blade position setting block 20 to fix them in place. A flange 24 is secured to the disk 13 by bolts 25. Reference numeral 26 designates a coil pusher formed with coil feeding lades 27 arranged in a coil receiving space 28 defined by adjacent blades 8. The coil pusher 26 is guided by blades 8 axially thereof for vertical movement. Blades 8 include elongated fixed blades 8a attached to the blade position setting block 20, and short movable blades 8b attached to coil pusher 26. Reference numeral 29 designates insulator guide slots each defined by adjacent insulator guides 9; 30, connecting rods secured at its upper end to the coil receiving plate 10 and at the lower end to the flange 24.

Figure 9:
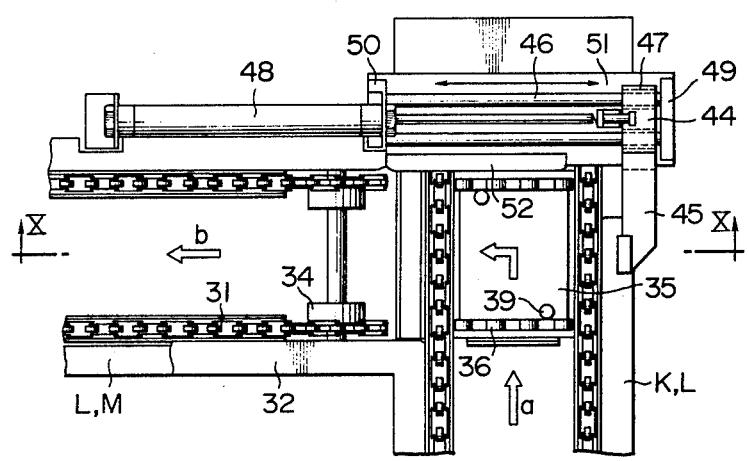
FIG. 9 is a plan view of the device for changing the direction of travel of the transfer tools.

The manner in which the transfer tool A is transported, will be described by referring to FIGS. 8 to 12. In FIG. 9, reference numeral 31 designates a pair of conveyor chains for supporting the lower pallet 12; 32, a guide for restricting sideways movements of upper and lower pallets 11 and 12 so as to prevent the transfer tool A from zigzaging; 33, chain rails forming a track for conveyor chains 31; 34, sprockets (See FIGS. 9 and 10) for connecting the conveyor chains 31 to form an endless chain. The sprockets 34 are mounted at either end of each conveyor. A motor, not shown, is connected to a drive shaft to which sprockets 34 are secured so as to drive endless conveyor chains 31. The conveyors J, K, L, M, N and O each constructed as described hereinabove are arranged as shown in FIG. 4.

Figure 10:
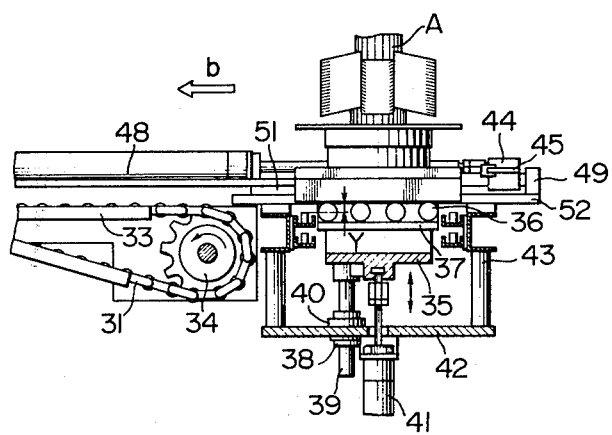
FIG. 10 is a front sectional view taken along the line X—X in FIG. 9.

The construction and operation of the devices C, E for changing the direction of movement of the transfer tools A will be described by referring to FIGS. 9 and 10. Reference numeral 35 designates an elevating plate having secured thereto a block 37 mounting rotatable rollers 36 for supporting the transfer tool A and guiding same to turn through 90 degrees; 38, slide bearings slidably supporting slide shafts 39 secured to elevating plate 35; 40, a holder for supporting the slide bearing 38; 41, a cylinder for vertically moving elevating plate 35. The transfer tool A moved in the direction indicated by an arrow a to the device C is lifted through a distance Y as shown in FIG. 10 when the cylinder 41 is actuated to move the elevating plate 35 upwardly. Reference numeral 42 designates a common plate to which the holder 40 and the cylinder 41 are secured; 43, connecting rods for securing the common plate 42 to the conveyor K (or L); 44, a slide block; 45, an arm secured to the slide block 44; 46, a slide shaft; 47, a slide bearing mounted in the slide block 44; 48, a cylinder for moving the slide block 44 in a sliding motion to advance in the direction of an arrow b through the agency of the arm 45 the transfer tool A which has been moved upwardly through the distance Y by the cylinder 41; 49, a block for supporting the slide shaft 46; 50, a block secured to a plate 51 for supporting the slide shaft 46 and the cylinder 48; and 52, a guide block for stopping the transfer tool A moved in the direction of arrow a.

Figure 11:
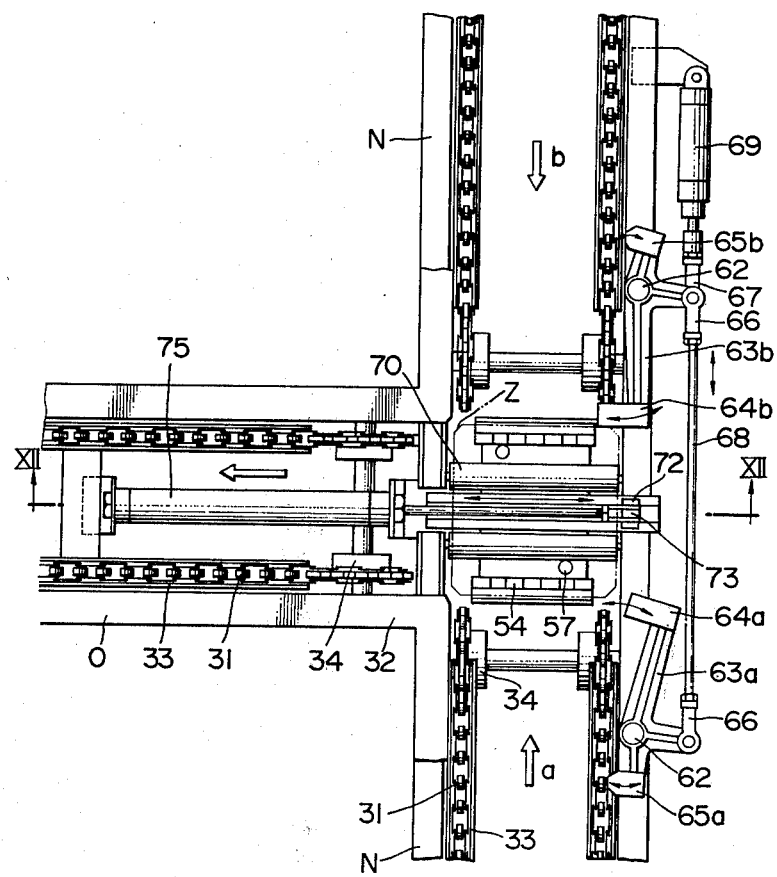
FIG. 11 is a plan view of the device for alternately advancing the coil-ladden transfer tools.
Figure 12:
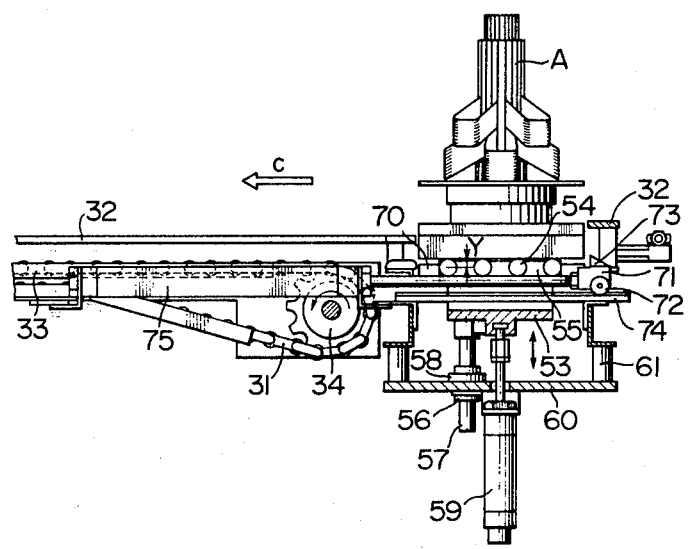
FIG. 12 is a front sectional view taken along the line XII—XII in FIG. 11.

The construction and the operation of the device for alternately advancing the coil-laden transfer tools A will be described by referring to FIGS. 11 and 12. In FIG. 12, reference numeral 53 designates an elevating plate having secured thereto a block 55 mounting rotatable rollers 54 for supporting the transfer tool A and guiding the same to turn through 90 degrees; 57, slide shafts secured to the elevating plate 53 and slidably supported by slide bearings 56; 58, a holder for supporting the slide shaft 56; 59, a cylinder for moving the elevating plate 53 vertically so as to move the transfer tool A upwardly through a distance Y; 60, a common plate to which the holder 58 and the cylinder 59 are secured; 61, connecting rods for connecting the common plate 60 to the conveyor N. In FIG. 11, reference numeral 62 designates pivot pins for supporting pivotal arms 63a and 63b respectively for pivotal movement; 64a, 65a, 64c and 64d, stoppers secured to the pivotal arms 63a, 63b for stopping the movement of the transfer tool A being conveyed; 66 and 67, rod-end supporters for supporting a connecting rod 68 connecting the pivotal arms 63a and 63b together; 69, a cylinder for moving the pivotal arms 63a and 63b in pivotal movement; and 70, drive rollers capable of rotating in the normal and reverse directions for moving the transfer tool A to an elevating position Z (FIG. 11). The actuation of the cylinder 69 alternately moves the pivotal arms 63a, 63b to the open and close positions thereof to alternately move to the elevating position Z the transfer tools A advancing in the directions of arrows a and b. Reference numeral 71 designates a block; 72 rollers rotatably mounted on the block 71; 73 claws for feeding the transfer tool A; 74, rails constituting a track for rollers 72; 75, a cylinder for advancing in the direction of an arrow c the transfer tool A that has been moved to the elevating position Z and moved upwardly through the distance Y by the cylinder 59.

Figure 13:
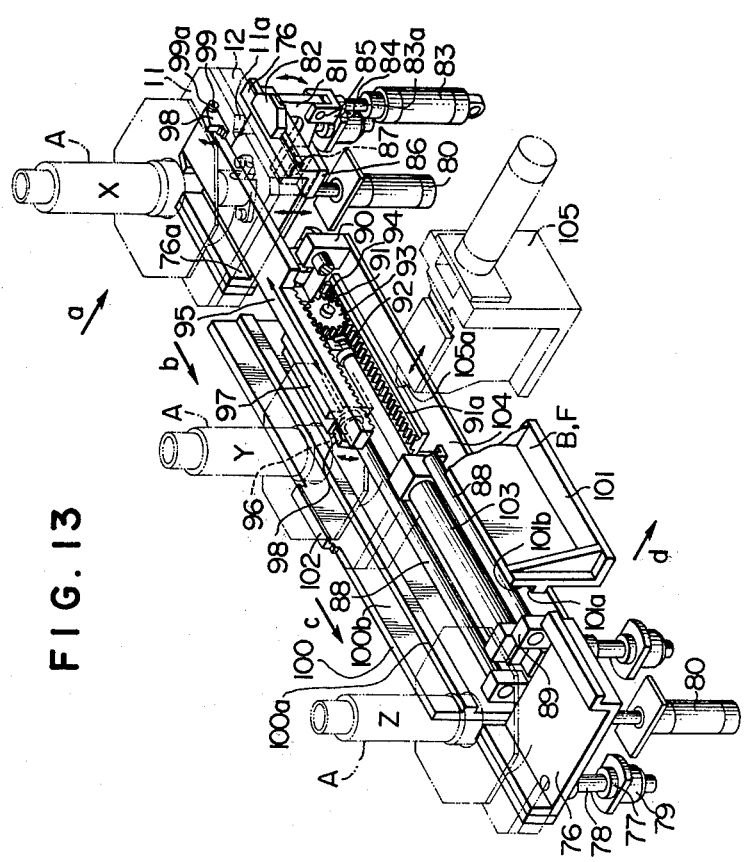
FIG. 13 is a perspective view of the transfer device mounted in the main coil winding device and the auxiliary coil winding device.
Figure 14:
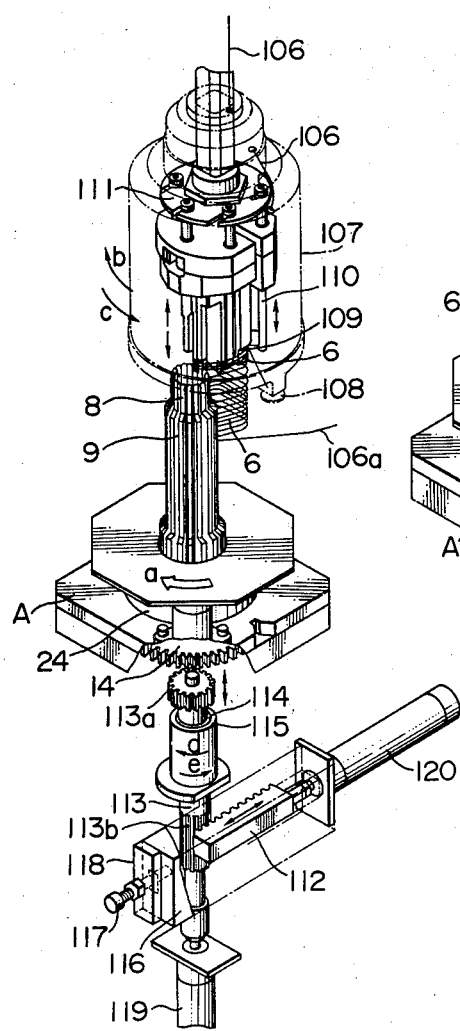
FIG. 14 is a perspective view showing the manner in which the main coils are wound by the main coil winding device and transferred to the transfer tool.
Figure 15:
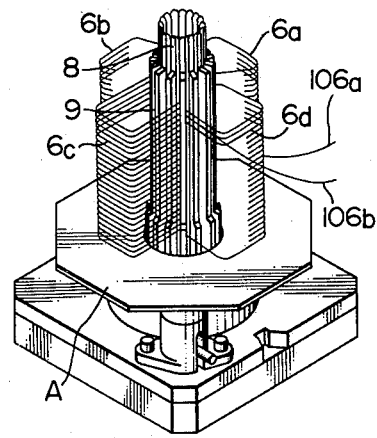
FIG. 15 is a perspective view of the transfer tool having transferred thereto main coils of all the poles wound by the main coil winding device.

The construction and operation of the main coil winding devices $B_1$ to $B_3$ will be described by referring to FIGS. 13–15. FIG. 13 shows a transfer device for delivering the transfer tool A to one of the main coil winding devices and releasing from the main coil winding device the transfer tool A after the main coils have been wound and transferred thereto. Reference numeral 76 designates an elevating plate; 77, slide bearings; 78, slide shafts secured to the elevating plate 76 and each slidably supported by one of the slide bearings 77; 79, a holder for supporting slide bearings 77; 80, a cylinder for vertically moving the elevating plate 76; 81, a stopper arm for stopping the transfer tool A, having a stopper 82 secured thereto; 83, a cylinder for moving the stopper arm 81 for pivotal movement; 84, a joint attached to the forward end of a rod 83a of the cylinder 83; 85, a pin for interconnecting the stopper arm 81 and the joint 84 for pivotal movement; 86, a block; 87 a pivot pin for rotatably supporting the stopper arm 81 and the block 86; 88, slide shafts supported by blocks 89 and 90; 91, a fixed rack formed with a sliding surface 91a for a slide block 92 to move in sliding movement thereon; 93, a gear in meshing engagement with the fixed rack 91; 94, a shaft for supporting gear 93 and mounting same on the slide block 92 for rotation; 95, a movable rack meshing with the gear 93; 96 designates slide bearings; 97, a slide block having a movable rack 95 secured thereto and slidably supported by the slide shafts 88 through the slide bearings 96; 98, claws for feeding the transfer tool A supported by a pivot pin 99 for pivotal movement and biased by a torsion coil spring 99a; 100 and 101, tool guides for guiding the sliding movement of the transfer tool A while limiting its sideways movement; 102, keep plates for avoiding an upward movement of the transfer tool A; 103, a cylinder for moving the movable rack 95 axially thereof in sliding movement to deliver and release the transfer tool A; 104, a plate having secured thereto the blocks 89 and 90, the fixed rack 91 and the cylinder 103; and 105, position regulating means having a projection 105a for positioning the transfer tool A.

The manner in which the transfer tool A is delivered to and released from one of the main coil winding devices $B_1$ to $B_3$ will be described. The transfer tools are shown in a delivery position X, a coil winding position Y and a release position Z respectively in FIG. 13. When the main coil winding device is in a standing-by state, the stopper arm 81 moves upwardly and the stopper 82 stops on the elevating plate 76 on the delivery side the transfer tool A transported by conveyor J (See FIG. 4) in the direction of an arrow a. The elevating plate 76 waits in a position slightly lower than the position of the conveyor chains 31 of the conveyor J and is moved upwardly by the cylinder 80 when the transfer tool A moves onto the elevating plate 76 so as to raise the transfer tool A to the delivery position X. Upon the transfer tool A reaching the delivery position X, the movable rack 95 having the claws 98 mounted thereon moves in a direction opposite to the direction indicated by an arrow b by passing through a clearance 76a defined between the lower pallet 12 of the transfer tool A and the elevating plate 76, until the movable rack 95 reaches the remote end of lower pallet 12. When the movable rack 95 starts the aforesaid movement, the claws 98 are urged downwardly by the rear end of lower pallet 12 but restored to their original positions by the biasing force of the torsion coil spring 99a so as to be brought into abutting engagement with the remote end of the lower pallet 12. Then, the movable rack 95 moves in the direction of arrow b, and the transfer tool A gripped by the claws 98 is transferred to a guide portion 100a, 100b, 101a and 101b formed by the tool guides 100 and 101 to be fed to the coil winding position Y. At this time, if there is a transfer tool A in the coil winding position on which main coils are wound, such a transfer tool A is gripped by the claws 98 at the end of the movable rack 95 near to the release position Z and transferred to the release position Z. The transfer tool A fed to the coil winding position Y is stopped in the position Y as the projection 105a of position regulating means 105 is brought into engagement in a notch 11a formed in the upper pallet 11. The elevating plate 76 on the release side operates in synchronism with the elevating plate on the delivery side and receives thereon the transfer tool A advanced from the coil winding position Y to the release position Z in the direction of an arrow c. When the transfer tool A is positioned on the elevating plate 76 on the release side, the latter moves downwardly to release the transfer tool A onto the conveyor chains 31 of the conveyor K (See FIG. 4). The direction in which the transfer tools A are fed to the main coil winding device and the direction in which they are discharged from the main coil winding device are reversed in the left and right assembly lines. However, there are no distinctions in construction and operation between the main coil winding devices on the left assembly line and those on the right assembly line.

Winding of the main coils and transferring of the wound coils to the transfer tool A will be described by referring to FIGS. 14 and 15. Reference numeral 106 designates a wire; 107, a flyer and 108 a nozzle. A forward end 106a of the wire 106 passed through the flyer 107 is held by cutting means, not shown, except when a main coil is wound. Reference numeral 109 designates a spool for winding a main coil 6 thereon; 110, coil pusher-rods for transferring the main coil 6 wound on the spool 109 to the transfer tool A; 111, a swinging disk moving in swinging movement as the flyer 107 rotates to move the coil-pusher-rods 110 vertically; 112, a rack; 113, a gear shaft mounting at its lower end a gear 113b meshing with the rack 112 and at its upper end a gear 113a meshing with the gear 14 of the transfer tool A; 114, a metal bearing; 115, a housing supporting the gear shaft 113 through the metal bearing 114 for rotational and sliding movements; 116, a guide block for guiding the rack 112 during its sliding movement; and 117, a stopper for regulating the stroke of movement of the rack 112. The stopper 117 is attached to the guide block 116 having secured thereto a plate 118. Reference numeral 119 designates a cylinder for moving the gear shaft 113 vertically; and 120, a cylinder for moving rack 112 axially.

Upon the transfer tool A being fed to the coil winding position Y and stopped by the position regulating means 105 (See FIG. 13), the spool 109 moves downwardly until it bites into the forward end portions of the blades 8 of the tool A to a suitable distance. Then, the flyer 107 begins to rotate in the direction of an arrow b (in the direction of an arrow c when the pole is even-numbered) in FIG. 14 to wind the main coil 6 on the spool 109. The main coil 6 wound in this way is successively moved through the vertical movement of the coil-pusher-rods 110 into the coil receiving space 28 (See FIG. 5) defined by the adjacent blades 8 of the tool A. When the winding of a main coil with a predetermined number of turns is completed, the spool 109 and the coil-pusher-rods 110 move downwardly to transfer the completed main coil 6 to the coil receiving space 28 of the tool A. At this time, the wire 106 released through nozzle 108 is held by gripper means, not shown. The operation of winding the main coil of the first pole and transferring same to the transfer tool A is finished when the wire 106 is held by the gripper means and the spool 107 and the coil-pusher-rods 110 move upwardly. Then, the cylinder 119 is actuated to move the gear shaft 113 upwardly to bring the gear 113a into meshing engagement with the gear 14, and the cylinder 120 is actuated to move rack 112 rightwardly in FIG. 14 to a predetermined distance so as to rotate the gear shaft 113 in the direction of an arrow e. This rotates the gear 14 through the gear 113a meshing therewith, so that the blades 8 and the insulator guides 9 will rotate together with the flange 24 through a predetermined angle in the direction of an arrow a. Upon the completion of the rotation and positioning of the blades 8 and the insulator guides 9, the cylinder 119 is actuated again to move the gear shaft 113 downwardly. As a result, the pin 15 moves downwardly and the key 16 is fitted into the keyway 13a of the disk 13 secured to the flange 24, thereby fixing the blades 8 and the insulator guides 9 in place.

The operation described hereinabove is repeated to successively wind the main coils of the second pole, the third pole and so on and transfer same to the transfer tool A. When the winding of the main coil of the final pole is finished, the wire 106 is cut by the cutting means so that one end portion of the wire 106 will serve as a lead 106b of the coil finally wound and the other end portion thereof will serve as a lead 106a of the main coil wound and is transferred first to the following transfer tool A. When the winding of the main coils of all the poles and transferring thereof to the transfer tool A is finished the projection 105a of the position regulating means 105 is withdrawn from the notch 118, and the transfer tool A is released from the coil winding position by the transfer device. FIG. 15 shows the transfer tool A to which the main coils of all the poles have been transferred upon the completion of winding thereof. In the embodiment shown and described herein, the main coils consist of the coils of four poles 6a, 6b, 6c and 6d.

The construction and operation of the transfer tool indexing device D will be described by referring to FIGS. 16 to 22. The manner in which the position of the transfer tool A is regulated will first be described by referring to FIGS. 16 to 18.

Figure 16:
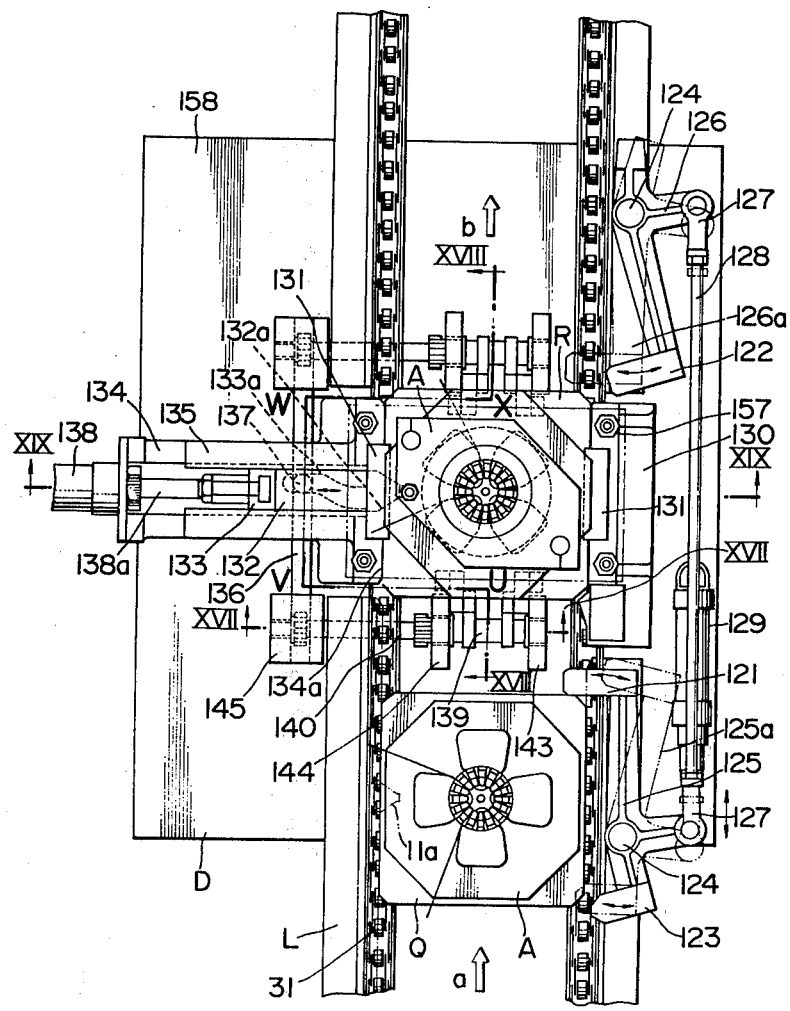
FIG. 16 is a plan view showing the manner in which the position of the transfer tool is regulated by the transfer tool indexing device.
Figure 19:
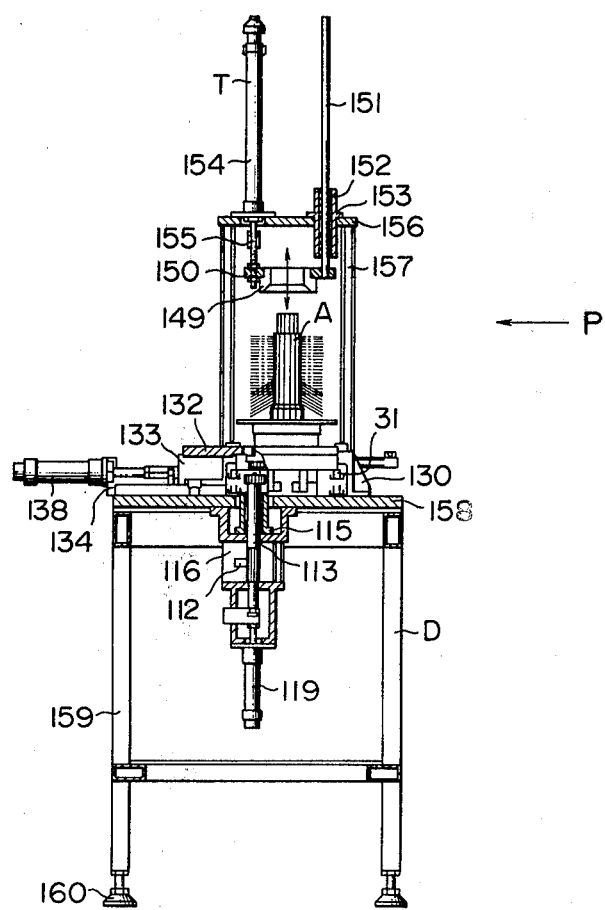
FIG. 19 is a side view of the transfer tool indexing device and the main coil holding-down device, shown in section along the line XIX—XIX in FIG. 16.

Reference numerals 121, 122 and 123 designate stoppers for stopping the transfer tool A being transported; 124, pivot pins respectively supporting pivotal pins 125, 126 for pivotal movement; 127, rod-end supporters supporting opposite ends of a connecting rod 128 for connecting together the pivotal arms 125 and 126 for pivotal movement; and 129, a cylinder for moving pivotal arms 125 and 126 in pivotal movement. In FIG. 16, the transfer tools A are shown in a waiting position A and an indexing position R, respectively. The transfer tool A advanced by the conveyor L in the direction indicated by an arrow a in FIG. 16 is temporarily stopped by the stopper 121 and remains in a waiting position. If the transfer tool A in the indexing position R has already been released therefrom, then the cylinder 129 is actuated to move the pivotal arm 125 to an open position shown at 125a, thereby removing the stopper 121 holding the transfer tool A in the waiting position. At the same time, the pivotal arm 126 connected to the pivotal arm 125 by the connecting rod 128 is actuated in conjunction with the pivotal movement of the pivotal arm 125 to move to a closed position indicated at 126a, thereby closing the stopper 122. Thus, the transfer tool A in the waiting position Q is moved until it abuts against the stopper 122. At this time, the stopper 123 secured to the other end of the pivotal arm 125 is closed, thereby stopping the following transfer tool A and preventing same from moving into the waiting position Q.

Reference numeral 130 designates a tool guide for restricting the sideways movement of the transfer tool A and guiding same for sliding movement; 131, keep plates for avoiding an upward movement of the transfer tool A; 132, a regulator having a projection 132a at its forward end; 133, a slide block having secured to its upper surface the regulator 132 and formed on its undersurface with a cam groove 133a; 134, a guide block for guiding the slide block 133 for sliding movement and at the same time restricting the sideways movement of the transfer tool A by guiding its sliding movement; 135, keep plates; 136, a rack slidably supported in a guide groove 134b of the guide block 134; 137, a cam roller supported by the rack 136 and engaged in the cam groove 133a on the underside of the slide block 133; 138, a cylinder for driving the slide block 133 axially thereof; 139, cam shafts each having a cam 139a and a gear 139b; 140, gear shafts each having a gear 140a meshing with the rack 136 and a gear 140b meshing with the gear 139b supported by one of the cam shafts 139; 141, 142, metal bearings; 143, brackets each supporting an end portion of one of the cam shafts 139 through the metal bearing 141 for rotation; 144, brackets each supporting an end portion of one of the cam shafts 139 and an end portion of one of the gear shafts 140 through the metal bearings 141, 142 respectively for rotation; 145, guide blocks each supporting an end portion of one of the gear shafts 140 through the metal bearing 142 for rotation and slidably guiding the rack 136; 146, pivotal levers supported by pivotal pins 147 respectively 148a, 148b, cam rollers supported on either end of each pivotal lever 146, cam rollers 148a abutting against the cams 139a and the cam rollers 148b abutting against the lower pallet 12 of the transfer tool A.

Upon the transfer tool A being moved to the indexing position R, the cylinder 138 is actuated to move the slide block 133 and the regulator 132 forwardly. As the slide block 133 moves forwardly, the cam roller 137 engaged in the cam groove 133a on the underside of the slide block 133 causes the rack 136 to move in the direction of an arrow c, the gear shafts 140 to rotate in the direction of an arrow e and the cam shafts 139 to rotate in the direction of an arrow g in FIG. 18. Rotation of the cam shafts 139 shifts the contact point of each cam 139 with each cam roller 148a from the bottom to the top with a result that the pivotal levers 146 move in pivotal movement in the direction of an arrow i and the cam rollers 148b lift the lower pallet 12 of transfer tool A to a position slightly higher than the conveyor chains 31 and hold same in this position. Further movement of the slide block 133 and the regulator 132 brings the projection 132a into engagement in the notch 11a formed in the transfer tool A, thereby positioning the latter. When the transfer tool A is thus positioned, the cylinder 129 is deactuated to close the stopper 121 and open the stopper 122. The completion of the operation of the transfer tool indexing device D deactuates the cylinder 138 to move the slide block 133 rearwardly. Then, all the parts operate in directions opposite to the directions of their movement described hereinabove for positioning the transfer tool A, in order to permit the transfer tool A to be transported by the conveyor L in the direction of an arrow b in FIG. 16.

Steps to be followed in indexing the transfer tool A and a main coil holding-down device T will be described by referring to FIGS. 19 to 22. Upon the transfer tool A being positioned, the blades 8 and the insulator guides 9 of the transfer tool A are rotated through a predetermined angle (45 degrees in this embodiment) in the direction of an arrow k in FIG. 21, in order to index the auxiliary coils with the main coils. The blades 8 and the insulator guides 9 are rotated in the same manner as they are rotated in the main coil winding device as described by referring to FIG. 14. Therefore, the detailed description of the manner of rotation of the blades 8 and the insulator guides 9 will be omitted.

Figure 20:
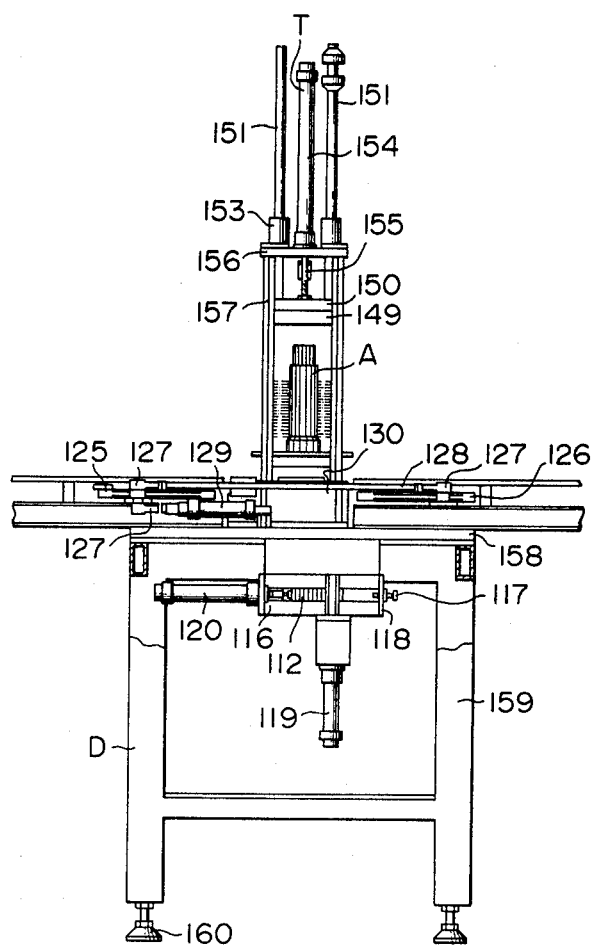
FIG. 20 is a front view of the transfer tool indexing device and the main coil holding-down device as seen in the direction of an arrow P in FIG. 19.
Figure 21:
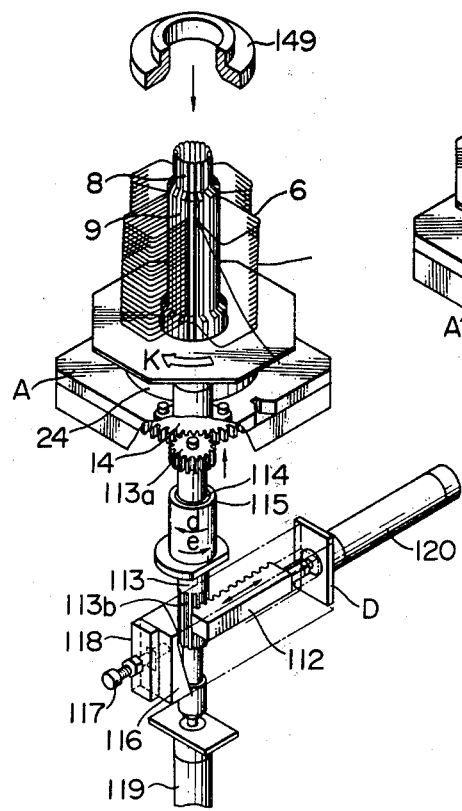
FIG. 21 is a perspective view showing the manner in which the transfer tool is indexed and the main coils are held down by the transfer tool indexing device.

Now the main coil holding-down device T will be described. In FIGS. 20 and 21, reference numeral 149 designates a main coil holding-down ring supported by an elevating plate 150 having the slide shafts 151 secured thereto; 152, slide bearings each supporting one of the slide shafts 151 for sliding movement and mounted in a housing 153; 154, a cylinder for moving the elevating plate 150 which is vertically adjustably connected to the elevating plate 150 by a connecting bolt 155; 156, a plate to which the housing 153 and the cylinder 154 are secured; 157, legs for supporting the plate 156; 158, a common plate on which the transfer tool indexing device D is mounted; 159, legs for supporting the common plate 157; 160, adjusting bolts for adjusting the height of the device D as a whole.

Figure 22:
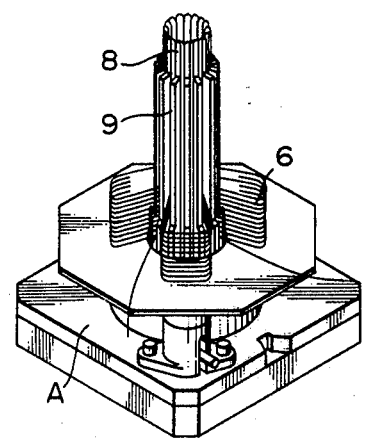
FIG. 22 is a perspective view of the transfer tool indexed by the transfer tool indexing device and having the main coils thereon held down by the main coil holding-down device.
Figure 25:
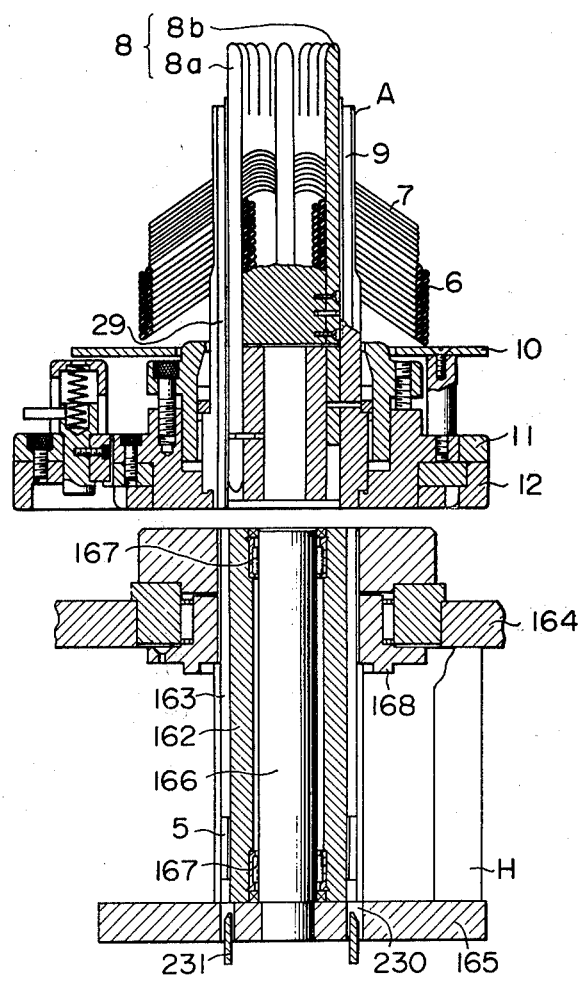
FIG. 25 is a front sectional view showing the transfer tool and the head of the insulator inserting device brought into alignment with each other at the insulator inserting device.

Upon the transfer tool A being positioned, and the blades 8 and the insulator guides 9 being indexed with a predetermined position, the cylinder 154 is actuated to move the elevating plate 150 downwardly so that the main coil holding-down ring 149 supported by the elevating plate 150 may hold down the main coils on the transfer tool A from the position shown in FIG. 21 to the position shown in FIG. 22. As the operation for holding down the main coils is completed, the elevating plate 150 is moved upwardly to a standby position by the cylinder 154, leaving the transfer tool A ready for transportation to one of the auxiliary coil winding devices $F_1$ to $F_4$.

The construction and operation of the auxiliary coil winding devices $F_1$ to $F_4$ will be described by referring to FIGS. 23 and 24. The transfer device for delivering the transfer tool A to one of the auxiliary coil winding devices and releasing same from the auxiliary coil winding device after completion of the winding of the auxiliary coils is similar to the transfer device mounted in the main coil winding device described hereinabove by referring to FIG. 13. Therefore, the detailed description of the transfer device will be omitted.

To wind the auxiliary coils and then transfer same to the transfer tool A will now be described. The transfer tool A shown in FIG. 14 has the main coils thereon which have been wound by one of the main coil winding devices, indexed and held down through the operation of the transfer tool holding-down device D. The transfer tool A shown in FIG. 14 is delivered by the transfer device shown in FIG. 13 to the coil winding position. Upon the transfer tool A being positioned in this way, a spool 161 for winding the auxiliary coils thereon is moved downwardly until it bites into the forward end portions of the blades 8 to a suitable distance. The auxiliary coils including one or a plurality of groups of speed regulation coils when necessary are wound and transferred to the transfer tool A in the same manner as described concerning the main coils as shown in FIG. 14; thus, the auxiliary coils will be inserted in the coil receiving space 28 defined by the adjacent blades 8 (See FIG. 5). The transfer tool A shown in FIG. 24 has thereon the auxiliary coils including one or a plurality of groups of the speed regulation coils which may be necessary for all the poles wound and transferred thereto through the operation of the auxiliary coil winding device. In this embodiment, the auxiliary coils include auxiliary coils 7a, speed regulation coils 7b and other speed regulation coils 7c for four poles.

Figure 26:
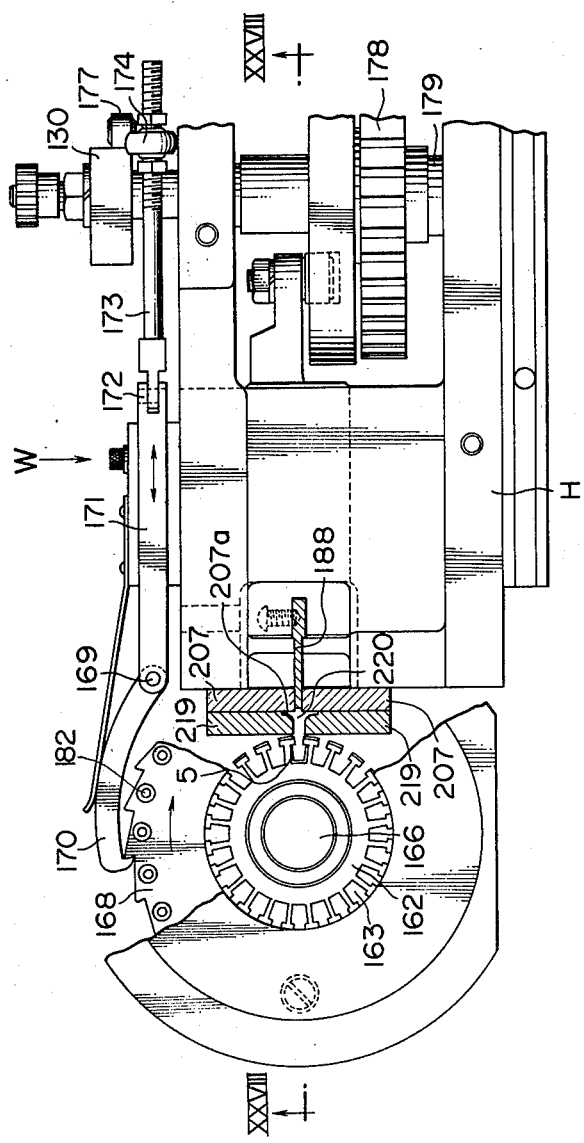
FIG. 26 is a plan view of a portion of the insulator inserting device for driving the head thereof.
Figure 27:
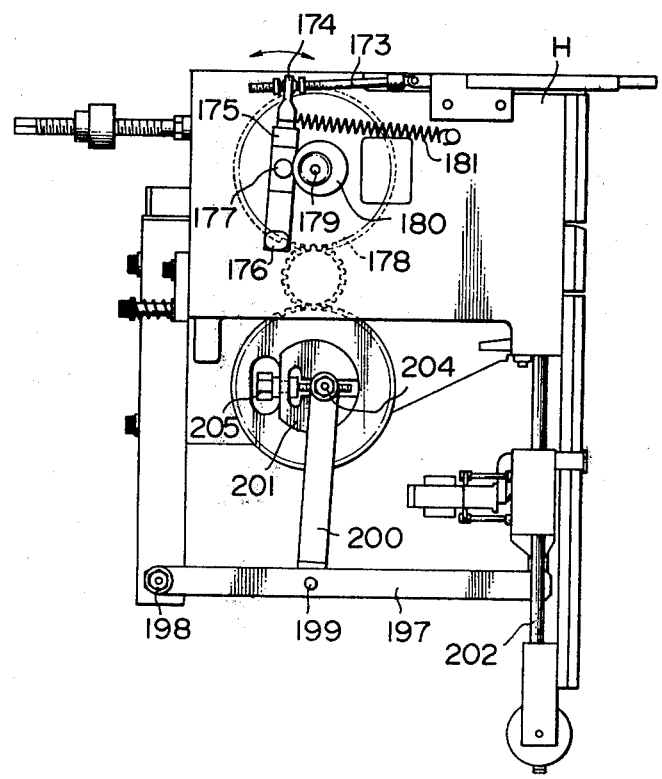
FIG. 27 is a front view of the drive portion of the insulator inserting device, as seen in the direction of an arrow W in FIG. 26.
Figure 28:
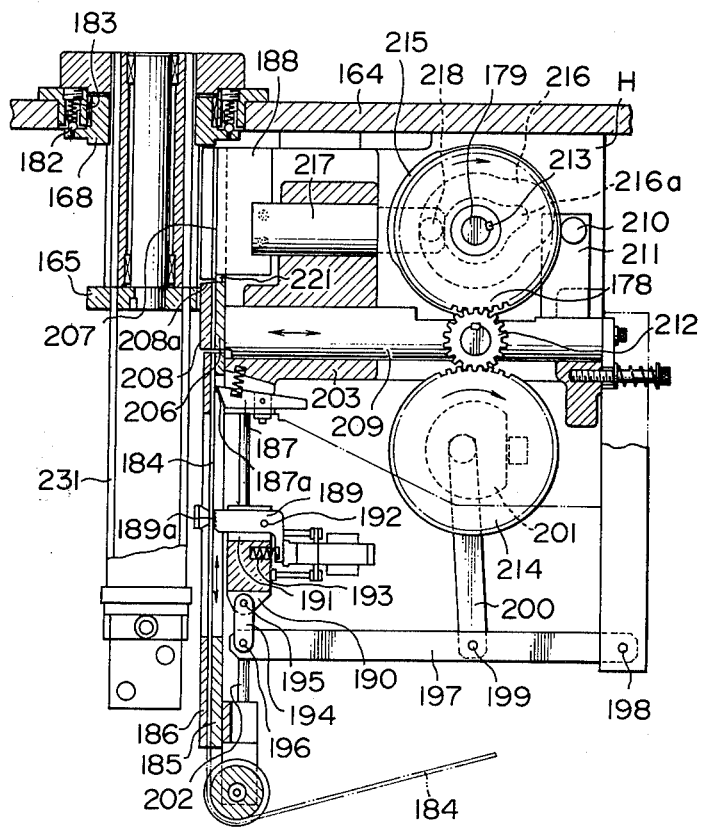
FIG. 28 is a front sectional view taken along the line XXVIII—XXVIII in FIG. 26.
Figure 29:
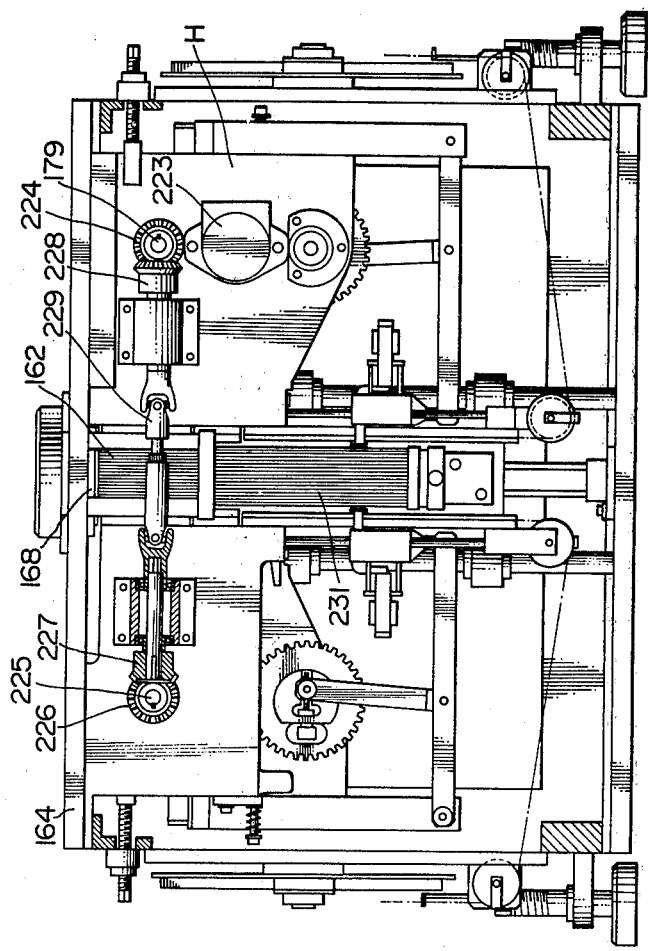
FIG. 29 is a front view of the insulator inserting device in its entirety.
Figure 30:
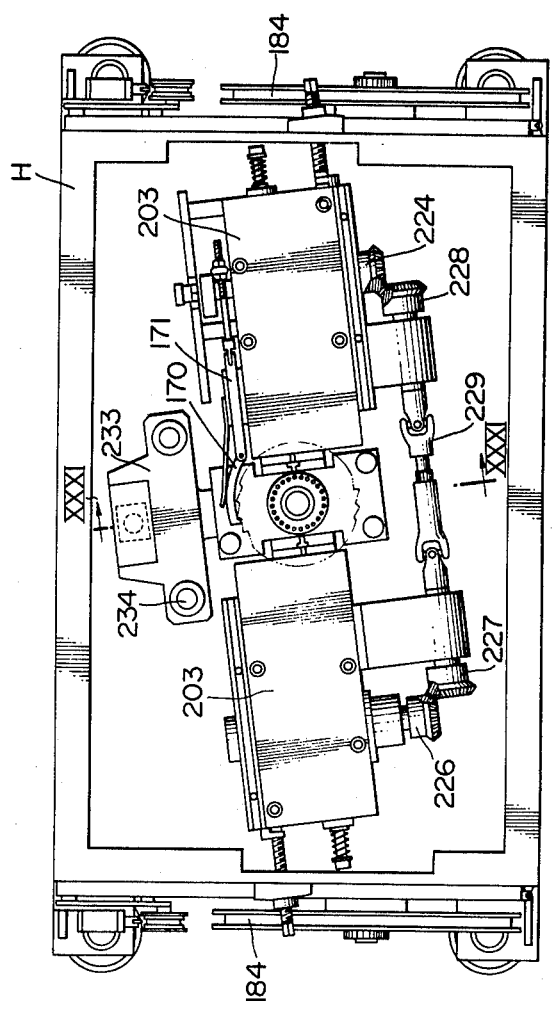
FIG. 30 is a plan view of the insulator inserting device shown in FIG. 29, with the stationary plate at the top of the device shown in FIG. 29 being removed.

The construction and the operation of the insulator inserting device H will be described by referring to FIGS. 25 to 31. The transfer tool A advanced by the conveyor O is positioned in the same manner as described by referring to FIGS. 16 to 18 with regard to the positioning of the transfer tool A at the transfer tool indexing device D. A guide housing 162 is formed on its outer circumferential surface with axial guide grooves 163 equidistantly located with one another and equal in number to the insulator guide slots 29 defined by the insulator guides 9. Thus, when the transfer tool A is positioned in the device D, the insulator guide slots 29 are aligned with the guide grooves 163. The guide housing 162 is supported between a stationary plate 164 and a support plate 165 for rotation about a shaft 166 through the bearings 167. Secured to the guide housing 162 is a sprocket 168 having teeth of the same number as the insulator guide grooves 163, and a pawl 170 pivotally supported by a pin 169 engages one of the teeth of sprocket 168 at its forward end as shown in FIG. 26. The pawl 170 is connected at the base to a slider 171 which is in turn connected at the other end thereof to a link 173 through a pin 172. The link 173 is connected to a lever 175 having a spherical bearing 174 secured thereto and pivotally supported by a pin 176. The lever 175 mounts a roller 177 at the middle portion thereof. In FIG. 27, a shaft 179 having a gear 178 secured thereto also has an eccentric cam 180 secured thereto with the roller 177 on lever 155 being positioned against the eccentric cam 180 by the biasing force of a spring 181. Rotation of the shaft 179 causes the eccentric cam 180 to move the lever 175 in pivotal movement through the roller 177, thereby moving the link 173 axially thereof and moving the slider 171 in reciprocatory movement. Reciprocatory movement of the slider 171 moves the sprocket 168 clockwise in FIG. 26 and brings the pawl 170 into engagement with the next following teeth on the sprocket 168. To enable the sprocket 168 to be kept in its position, conical counter sinks equal in number to the teeth of sprocket 168 are formed equidistantly with each other in the sprocket 168 to receive balls 182 and springs 183 therein as shown in FIG. 28, so that sprocket 168 will be pressed by the biasing forces of the springs 183 through the balls 182. There is provided a groove-like guide 185 through which an elongated insulator 184 wound on a reel in roll form is fed to means for cutting and shaping, which guide 185 has a doubling plate 186 for allowing the insulater 184 to be correctly inserted into the groovelike guide 185. Reference numeral 187 designates a pivotally supported pawl having teeth 187a arranged to contact to the insulator 184, the pawl 187 being mounted such that it permits the insulator 184 to advance toward a shaping punch 188 but prevents its rearward movement away from the punch 188. As means for feeding a predetermined length of the insulator 184 to the shaping punch 188, a feed pawl 189 having teeth 189a is provided and supported by a pin 192 in a slot 191 formed in a feed block 190 for pivotal movement as shown in FIG. 28. A spring 193 is mounted in the feed block 190 for urging the feed pawl 189 into engagement with the insulator 184 by its biasing force, with a result that the teeth 189a are in contact with the insulator 184. Upon the feed pawl 189 being moved toward the shaping punch 188, the insulator 184 is fed. Movement of the feed pawl 189 away from the insulator 184 results in the feed pawl 189 rotating slightly clockwise about the pin 192 in FIG. 28. The pressure applied by the teeth 189a to the insulator 184 at this time is not so high. Although a downwardly driving force is exerted on the insulator 184 at this time, downward movement of the insulator 184 is prevented by the pawl 187.

A link 194 is connected by pins 195 and 196 to the block 190 and a lever 197 respectively, for moving the feed pawl 189 vertically in reciprocatory movement in FIG. 28. The lever 197 is supported at the other end thereof by a pin 198 for pivotal movement and has a pin 199 attached thereto midway thereof for connecting the lever 197 to another link 200 which in turn is eccentrically connected to a rotary wheel 201. Rotation of the rotary wheel 201 moves the link 200 vertically in swinging movement so as to move the feed block 190 and the feed pawl 189 toward and away from the shaping punch 188. A guide shaft 202 extends parallel to the groove-like guide 185 to maintain the vertical reciprocatory movements of the feed block 190 and the feed pawl 189 in appropriate relation to the insulator 184. The guide shaft 202 is connected at its upper end to a main body casing 203 and extends at its lower end portion through an opening formed in the feed block 190. When the feed block 190 is moved vertically in reciprocatory movement by the lever 197, the movement of the feed block 190 is guided by the guide shaft 202 to be maintained parallel to the groove-like guide 185 so as to permit the insulator 184 to be fed in a suitable manner at all times. In FIG. 27, the rotary wheel 201 has a block provided with a pin 204 and threadably connected through a bolt 205 to the link 200, the center position of the pin 204 being displaced from the center of rotary wheel 201. The amount of the eccentricity of the pin 204 can be varied as desired by rotating the bolt 205 so as to vary the angle of the pivotal movement of the lever 197 and the vertical stroke of the feed block 190.

As the feed pawl 189 moves toward the shaping punch 188, the insulator 184 is fed to a guide 207 through a guide 206. The length of the insulator 184 fed in this way can be varied by adjusting the vertical stroke of the feed block 190 as described hereinabove to conform to the thickness of coils wound on the stator core. Cutting, shaping and pushing-through of the insulator will be described by referring to FIGS. 26 and 28. Reference numeral 208 designates a cutting block including an insulator guide portion and having a cutter 208a at its forward end; 209, a shaft secured to the cutting block 208; 210, a roller secured to a support plate 211 which in turn is secured to the shaft 209 guided by main body casing 203 for sliding movement; 212, a gear secured to an output shaft of a motor, not shown; 213, a key for securing the gear 178 to the shaft 179; and 214, secured to the rotary wheel 201. The gear 212 meshes with the gears 178, 214 to rotate same. Reference numeral 215 designates a plate cam secured to the gear 178. Upon rotation of the gear 178 clockwise in FIG. 28, the plate cam 215 rotates in the same direction to move the shaft 209 axially thereof in reciprocatory movement through a support plate 211 having a roller 210 secured thereto. Reference numeral 216 designates a groove cam secured to the shaft 179; 217, a shaft having the shaping punch 188 secured thereto; 218, a roller mounted in the shaft 217 and in engagement with a cam groove 216. Rotation of the cam groove 216 moves the shaft 217 leftwardly as a projection 216a is brought into contact with the roller 218. Reference numeral 219 designates a holding-down guide for preventing upward movement of the insulator 184 in guiding the latter. In FIG. 26, 220 designates a slot defined between the guide 207 and the holding-down guide 219. Movement of the feed block 190 in the upward direction feeds a predetermined length of the insulator 184. Then, the shaping punch 188 is moved leftwardly in FIG. 28 by the rotation of the cam groove 216. The punch 188 has a cutter 221 at its lower end so that when the cutting block 208 is moved rightwardly as the punch 188 is moved leftwardly, the insulator 184 is cut by the cutters 221 and 208a cooperating with each other. After cutting the insulator 184, the punch 188 continues its leftward movement to shape the severed length of the insulator 184 and insert same into one of the guide grooves 163 of the guide housing 162 shown in FIG. 25. Then the punch 188 moves rightwardly. At this time, the punch 188 is disposed rightwardly of a guide surface 207a of the guide 207 for the insulator 184.

After a predetermined length of the insulator 184 is fed, cut and inserted in one of the guide grooves 163, the sprocket 168 is moved by a distance of one tooth. At the same time, a predetermined length of the insulator 184 is again fed, cut and inserted into the next guide groove 263. By repeating this operation, it is possible to insert insulating pieces 5 in all the guide grooves 163. A method consisting of cutting and shaping the insulating pieces 5 in two positions diametrically opposed to each other for shortening the time required for the operation of cutting and inserting insulating pieces 5 into guide grooves 163 will now be described.

Two devices described hereinabove for feeding the insulator 184 to the shaping punch 188 for cutting, shaping and inserting insulating pieces 5 in the guide grooves 163 are secured to the stationary plate 164 in diametrically opposed positions on the outer circumferential surface of the guide housing 162. One of these devices has the ratchet 168 and associated parts for advancing same, while the other device lacks such means. A motor 223 (FIG. 29) is connected to the device having the sprocket 168 and associated parts, and a gear 212 (FIG. 28) is connected thereto. A bevel gear 224 (FIG. 29) is secured to one end of the shaft 179 having the gear 178 meshing with the gear 212. A cam shaft 225 of the other device has a bevel gear 226 secured thereto. A bevel gear 227 meshes with the bevel gear 226 and a bevel gear 228 meshes with the bevel gear 224 with the bevel gears 227 and 228 being interconnected through a shaft coupling 229 to connect the two devices together for synchronous operation. Let us now describe the manner in which the plurality of the insulating pieces 5 inserted in the guide grooves 163 of the guide housing 162 are inserted in the insulator guide slots 29 of the transfer tool A.

Figure 31:
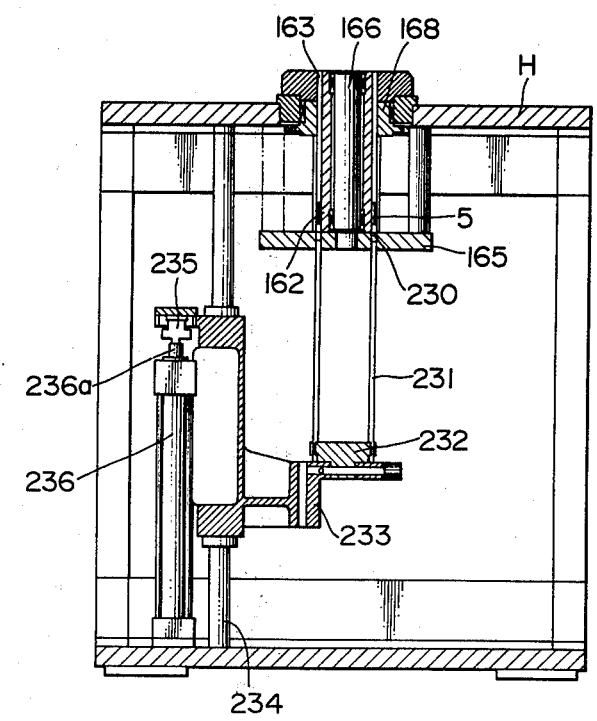
FIG. 31 is a side sectional view taken along the line XXXI—XXXI in FIG. 30.
Figure 32:
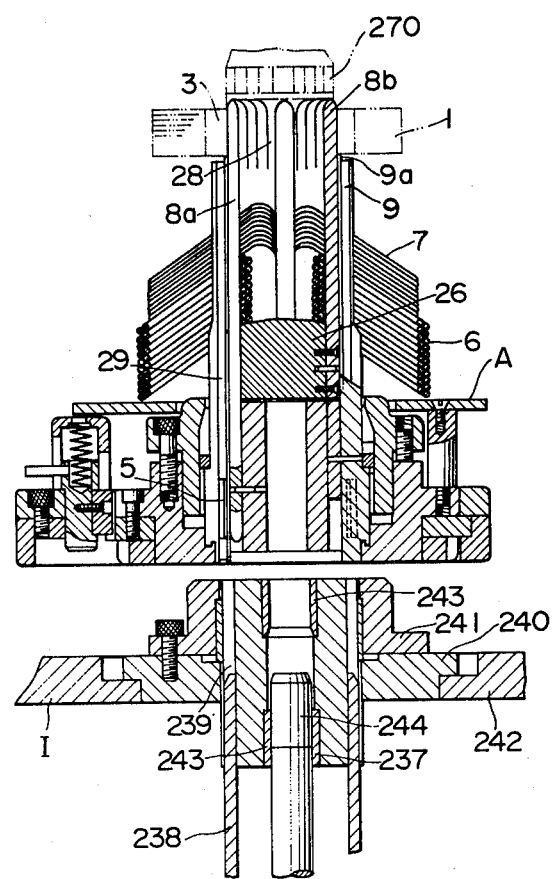
FIG. 32 is a front sectional view showing the transfer tool and the head of the drawing-in device brought into alignment with each other at the drawing-in device.

In FIG. 31, the support plate 165 is formed therein with a plurality of openings 230 corresponding in position axially with the insulator guide grooves 163 and the insulating piece guide slots 29. Each opening 230 guides one of a plurality of elongated insulator pushers 231 of the same shape as the insulator guide grooves 163 for inserting the insulating pieces 5 in the lower end portions of the insulating piece guide slots 29 of the transfer tool A from the insulator guide grooves 163 of the guide housing 162. The insulator pushers 231 are secured to a support plate 232 and arranged equidistantly from one another in such a manner that they are aligned axially with the insulator guide slots 29 of the transfer tool A. The insulator pushers 231 have forward end portions disposed downwardly of the upper surface of the support plate 165. The support plate 232 is threadably connected to a moving body 233 formed with a bore for permitting a guide shaft 233 to move therethrough in sliding movement. A moving body 233 is connected to a rod 236a of a cylinder 236 through a joint 235.

To insert the insulating pieces 5 in the lower end portions of the insulating piece guide slots 29 of transfer tool A, the rod 236a of the cylinder 236 is moved forwardly a predetermined stroke to move the insulating pieces 5 upwardly to insert same in the insulating piece slots 29. Then, the rod 236a is moved rearwardly to restore the insulator pusher 231 to its original position. Thereafter, a rod 138a of the cylinder 138 of the device for regulating the position of the transfer tool A shown in FIGS. 16 and 17 is moved rearwardly. By this operation, the transfer tool A is placed on the conveyor chains 31 and advanced to the drawing-in device I in the same manner as described with regard to the transfer tool indexing device D.

The construction of the drawing-in device I will now be described by referring to FIGS. 32 to 38. Like the transfer tool A delivered to the insulator insertion device H, the transfer tool A delivered to the drawing-in device I has its position regulated. Below the transfer tool A in FIG. 32, reference numeral 237 designates a housing formed on its outer circumferential surface with guide grooves 239 extending axially and disposed equidistantly from one another to guide the insulator pushers 238 moving therethrough. When the insulating piece guide slots 29 are 16 (sixteen) in number, for example, the guide grooves 239 are also 16 (sixteen) in number and aligned with the insulating piece guide slots 29. Reference numeral 240 designates a flange fitted over the housing 237 for securing the latter in place by a keep ring 241; 242, a support plate to which flange 240 is secured; 243, bearings mounted in the housing 237 for guiding a coil pusher-rod 244; and 245, a support plate for supporting the insulator pushers 238 in grooves formed therein for setting the lower ends of the insulator pushers 238 equidistantly from one another circumferentially of the support plate 245. The coil pusher-rod 244 is secured to the center of support plate 245 and has formed at its forward end a recess for attaching and detaching the coil pusher 26. Reference numeral 246 designates a movable guide formed therein with a plurality of openings for guiding the intermediate portions of insulator pushers 238. The movable guide 246 is also formed at its center with an opening 246a larger in diameter than the coil pusher-rod 244, and with two openings having slide bearings 247 respecitvely mounted therein. Reference numeral 248 designates guide shafts slidably supported by slide bearings 247 and secured at upper ends thereof to flange 240; 249, a pusher having the support plate 245 secured thereto and slide bearings 250 secured to either end thereof. The pusher 249 also has ball screw bearings 251 secured to portions thereof disposed rightwardly and leftwardly of its center respectively. Reference numeral 252 designates shafts secured at opposite ends thereof to the support plate 242 and a bottom plate 253 for guiding the slide screw bearings 250 mounted in the pusher 249; 254, ball screw shafts rotatably supported at the upper ends thereof by the support plate 242 through bearings 255 and 256 and at lower ends thereof by the bottom plate 253 throught bearings 257 and 258; 259, receiver rings each positioned against the upper end of the inner race of one of the bearings 258; 260, sprockets each secured to one of the ball screw shafts 254 by forcing a clamping ring 261 against the sprocket 260 by a holding down plate 262; 263, a motor secured to a base 264 and having an output shaft extending downwardly for mounting a sprocket at its end; 265, chains connected to the sprockets 260 at the lower ends of the ball screw shafts 254 and the sprocket secured to the end of the output shaft of the motor 263; 266, stopper bolts threadably connected to the undersurface of the pusher 249 for freely adjusting their length; 267, stopper blocks each abutting against one of stopper bolts 266 for stopping the movement of the pusher 249; and 268, stopper bolts abutting against the support plate 242 when the pusher 249 moves upwardly to stop the movement of the pusher 249. The stopper bolts 268 are threadably connected to the upper surface of the pusher 249. Reference numeral 269 designates a main body supporting the support plate 242 at its top and the bottom plate 253 at its bottom; 270, a blade position setter (See FIG. 35) formed with a plurality of blades 271 equidistantly disposed from one another at the outer circumferential surface of setter 270 and interfitting with the coil receiving space 28 defined by the blades 8 of the transfer tool A for setting the position of the blades 8 by adjusting their spacing; and 272, a coupling bolster. A stationary cylindrical body 273 is secured to support plate 242 at a right angle through a plate 274. Reference numeral 275 designates bearings each mounted in one of arms 276;

and 277, shafts secured to a plate 278 and each guided by one of the bearings 275. A plate 278 supports the upper portion of the stationary cylindrical body 273 and the lower ends of the shafts 277. Reference numeral 279 designates a mounting portion disposed at the forward end of the arm 276.

The coupling bolster 272 has secured to its lower end through a shaft coupling 280 a rod 281a of a cylinder 281 and moves vertically in sliding movement as the rod 281a advances and retreats.

In FIGS. 35 to 38, reference numeral 282 designates a holding-down plate supported by a pusher block 283 for contacting the upper surface of a stator; 284, rollers each supported by one of shafts 285 disposed perpendicular to the support plate 282 and secured to the pusher block 283; and 286, a cam plate formed with a groove cam 287 rounded at its upper end and having a lower end parallel to the insulator guides 9 with rollers 284 being in contact with the rounded upper end for movement along the cam surface. A link 288 connected to the pusher block 283 by the shafts 285 is connected at one end thereof to a lever 290 by a shaft 289, and the lever 290 is secured at the other end thereof to the cam plate 286 by a shaft 291. The lever 290 is pivotable about the shaft 291, and the link 288 is pivotable about the shafts 285 and 289. A coupling link 292 is connected at one end thereof by a shaft 293 to the center of the lever 290 and at the other end thereof to a rod 294a of a cylinder 294. The cylinder 294 is connected at its rear to a support plate 296 by a shaft 295, and the support plate 296 is secured to a main body 297 formed therein with an opening for receiving stationary cylindrical body 273 having axial grooves formed by the split main body 297. Bolts 298 are thereaded into the main body 297 for reducing the width of the grooves. A shaft 299 is located parallel to the stationary cylindrical body 273 for sliding movement along a groove in the main body 297, to keep the direction of the main body 297 constant. The support plate 278 has threadably connected thereto a bolt 300 connected at its lower end to a T-recess in the main body 297. By turning the bolt 300 circumferentially thereof, it is possible to move the main body 297 vertically in sliding movement.

Figure 35:
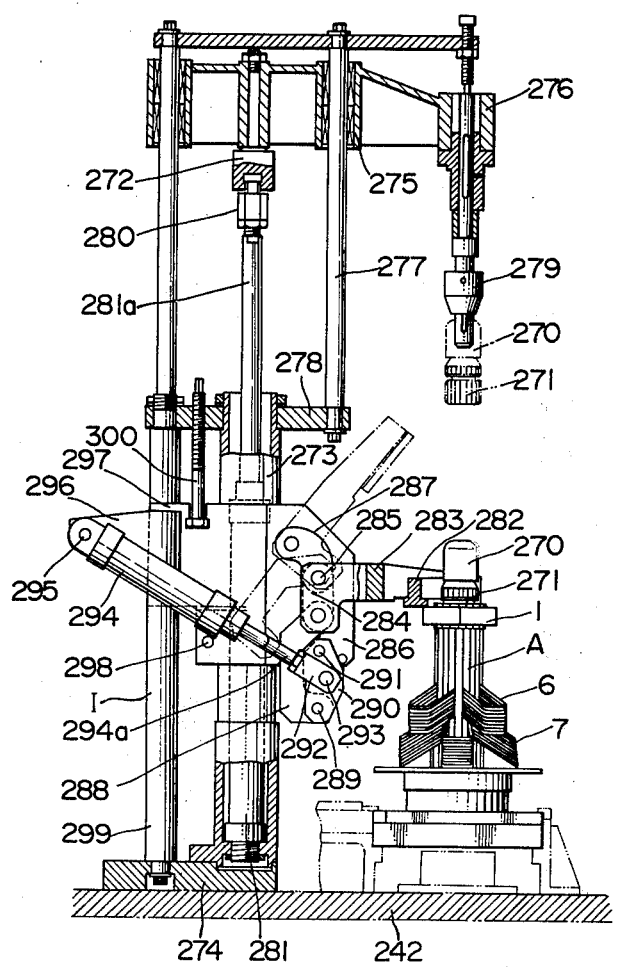
FIG. 35 is a front view of the clamping means located in the upper portion of the drawing-in device.
Figure 36:
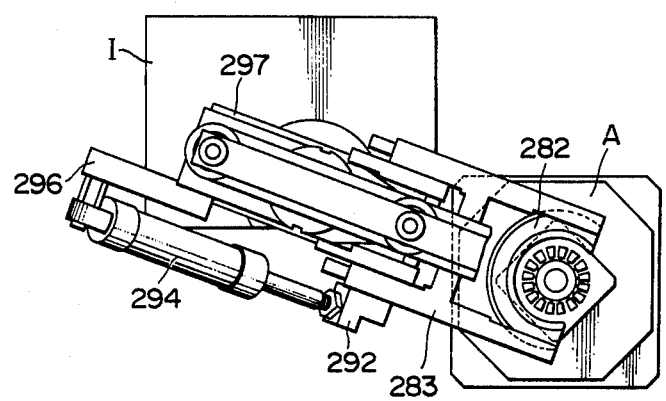
FIG. 36 is a top plan view of the clamping means shown in FIG. 35.
Figure 37:
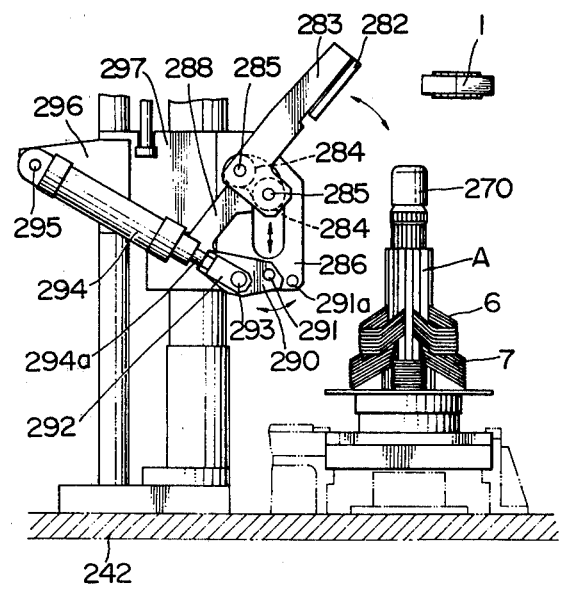
FIG. 37 is a front view of a portion of the device shown in FIG. 35.
Figure 38:
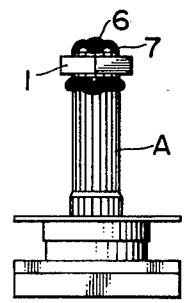
FIG. 38 is a front view of the stator body having the main coils the auxiliary coils and the insulator transferred thereto from the transfer tool.

In operation, the transfer tool A has its position regulated like the transfer tool A in the insulator insertion device H. When the transfer tool A is positioned in this way, a plurality of the insulating pieces 5 are inserted in the insulator guide slots 29 at the lower portion of tool A. Initially, the blade position setter 270 for positioning the annularly arranged blades 8 equidistantly from one another is mounted in the mounting portion 279 and waits for its operation above the transfer tool A. Rearward movement of the rod 281a of the cylinder 281 moves the mounting portion 279 downwardly to insert the blade position setter 270 into the blades 8. Thereafter, the mounting portion 279 is released from the blade position setter 270 which remains in the blades 8. Forward movement of the rod 281a moves the mounting portion 279 to a position above the tool A to standby. Then, the operator puts teeth 301 (See FIG. 1) of the stator core 1 into grooves 302 (See FIG. 7) of the blades 8 and then pushes until they come into contact with the projections 9a of the insulator guides 9. For inserting the main coils 6, the auxiliary coils 7 and the insulating pieces 5 in the slots 3 of the stator coil 1, the coils come into contact with the sides of the slots 3 and may lift the stator core 1 away from the projections 9a. If the stator core 1 is released from the projections 9 during operation, difficulty will be experienced in drawing the coils and the insulating pieces correctly into the stator grooves because the main coils 6, the auxiliary coils 7 and the insulating pieces 5 are not positioned properly in the slots 3. To avoid this problem, means should be provided for fixing the stator core axially in place while the coils and the insulating pieces are being inserted. Also, it is not enough merely to force the stator core 1 against the projections 9a of the insulator guides 9; it is necessary to provide a space large enough to permit the stator core 1 to be inserted and withdrawn. To this end, the rod 294a of the cylinder 294 is moved forwardly as shown in FIG. 35 to move, through the coupling link 292, the lever 290 in pivotal movement about the shaft 291. Pivotal movement of the lever 290 moves the position of the shaft 289 at the lower end of the link 288 downwardly as the link 288 moves in pivotal movement about shafts 285 with a result that the positions of the shafts 285 at the upper end of the link 288 moves downwardly as the rollers 284 track downwardly along the cam groove 287. When the upper roller 284 mounted in pusher block 283 reaches from the rounded portion to a straight portion of the cam groove 287, the pusher plate 282 which has been inclined with respect to the axis of the insulator guides 9 becomes perpendicular to the upper surface of the stator. Further forward movement of the rod 294a brings lever 290 into abutting engagement with a stopper pin 291a secured to the cam plate 286 (FIG. 37), thereby stopping rod 294a. At this time, the two rollers 284 are in contact with the straight portion of the cam groove 287, and the holding-down plate 282 is in contact with the upper surface of the stator core 1 in parallel therewith.

Figure 33:
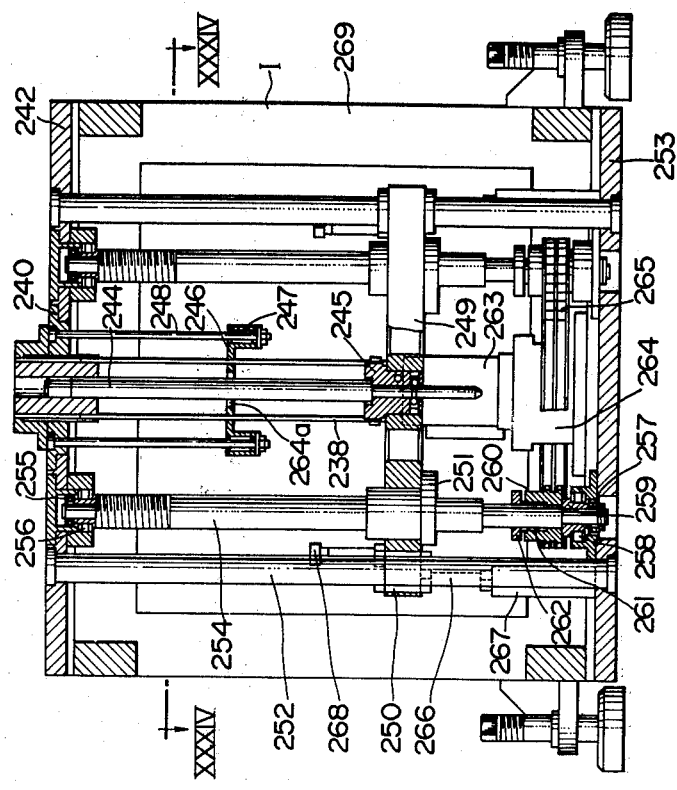
FIG. 33 is a front sectional view of the drawing-in device in its entirety.
Figure 34:
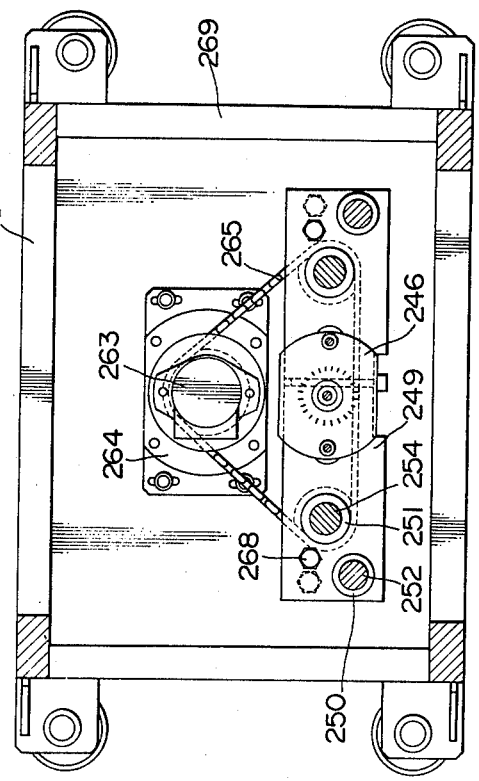
FIG. 34 is a front sectional view taken along the line XXXIV—XXXIV in FIG. 33.

Then, the motor 263 shown in FIG. 33 is actuated to rotate the ball screw shafts 254 to move the pusher 249 upwardly. The coil pusher-rod 244 moves upwardly together with the pusher 249 until it is gripped by a gripper, not shown, of the coil pusher 26 of the transfer tool A so that the rod 244 is connected to the pusher 26. The upper surfaces of the insulator pushers 238 and the upper surface of the coil pusher 26 become constant in height, and move in a constant relation as the pusher 249 moves upwardly. Further upward movement of the pusher 249 brings the upper surfaces of the insulator pushers 238 into contact with the undersides of the insulating pieces 5, so that the former move the latter upwardly. The coil pusher 26, the movable blades 8b and the insulator pushers 238 move as a whole axially of the stator core 1 while being maintained in constant relative positions so that the movable blades 8b secured to the coil pusher 26 are positioned higher than the fixed blades 8a. The pusher 249 becomes stationary when the upper surface of the coil pusher 26 is disposed in a position higher than that of the stator core 1. At this time, the coil pusher 26 has finished to operation of axially inserting the main and auxiliary coils in the slots 3 of the stator core 1, and the insulator pushers 283 have finished the operation of inserting insulating pieces 5 in the slots 3 of the stator core 1. The blade position setter 270 which is disposed at the forward ends of the movable blades 8b is mounted in the mounting portion 279. Thereafter, the motor 263 is rotated in the reverse direction to move the pusher 249 downwardly and to restore the coil pusher rod 244 and the insulator pushers 238 to their original positions. Then, the holding-down plate 282 is released from contact with the upper surface of stator core 1 which is manually removed from the transfer tool A.

This completes the insertion of the main coils 6, the auxiliary coils 7 (including one or a plurality of the speed regulation coils when necessary) and the insulating pieces 5 in the stator core 1 simultaneously in one operation. The transfer tool A is placed by the operator on the conveyor J.

Figure 39:
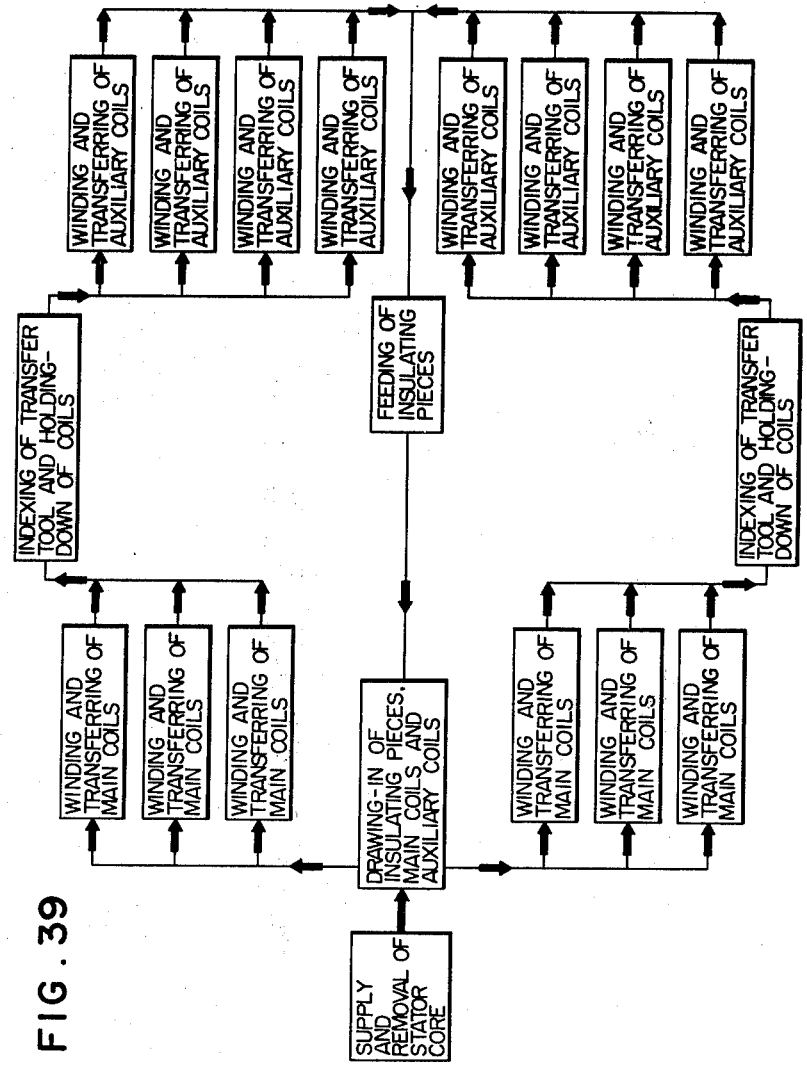
FIG. 39 is a flow chart of the embodiment shown in FIG. 4.

The embodiment of the invention shown and described hereinabove is shown in a flow chart in FIG. 39. As is apparent from the figure, the embodiment can achieve the following effects:

(1) The main coil winding device and the auxiliary coil winding device which are each constructed as a unitary structure can be mounted in any number as desired longitudinally of an assembly line depending on the desired production level.

(2) The apparatus can be operated completely automatically without requiring any manual attention if means for transferring a transfer tool from the drawing-in device to a conveyor and an industrial robot for feeding an empty stator core to the transfer tool and removing the core-wound stator core therefrom are mounted in the drawing-in device.

(3) The insulator insertion device for inserting insulating pieces in a transfer tool can be arranged in any position as desired along an assembly line so long as such position permits insertion of insulating pieces in the transfer tool to be performed prior to the insertion of the coils and the insulating pieces in a stator core.

(4) The arrangement of the main and auxiliary coil winding devices along an assembly line can be varied to suit the specifications.

Figure 40:
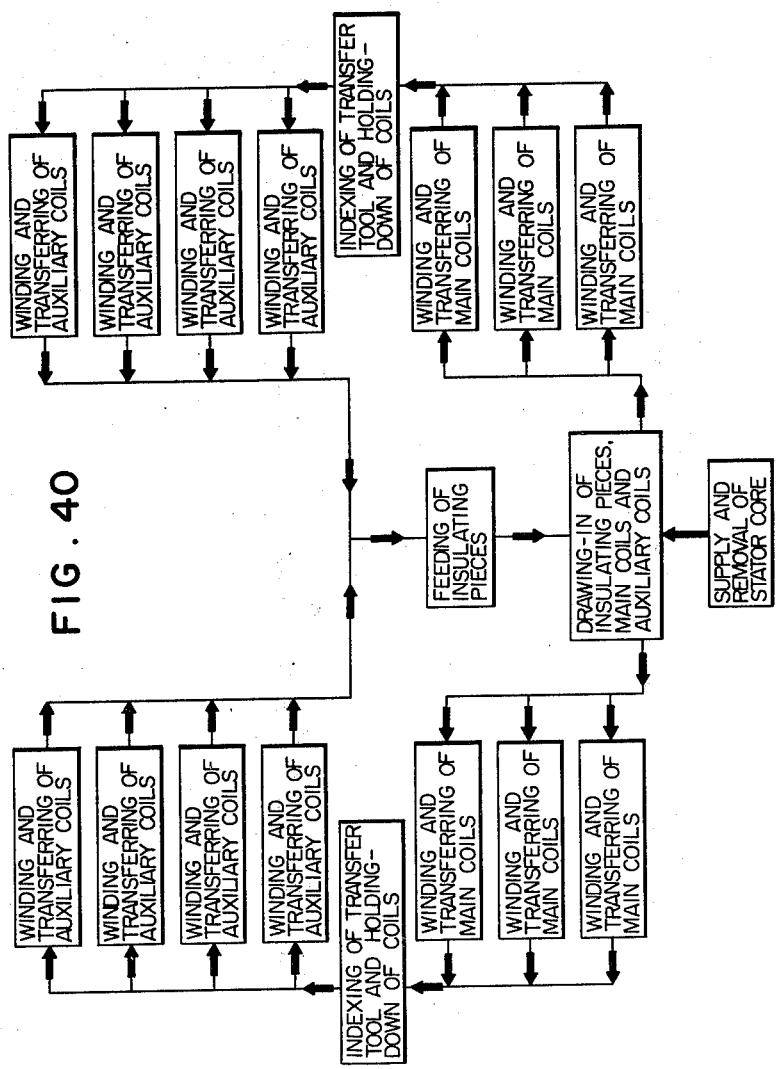
FIGS. 40 and 41 are flow charts of modifications of the embodiment shown in FIG. 4.
Figure 41:
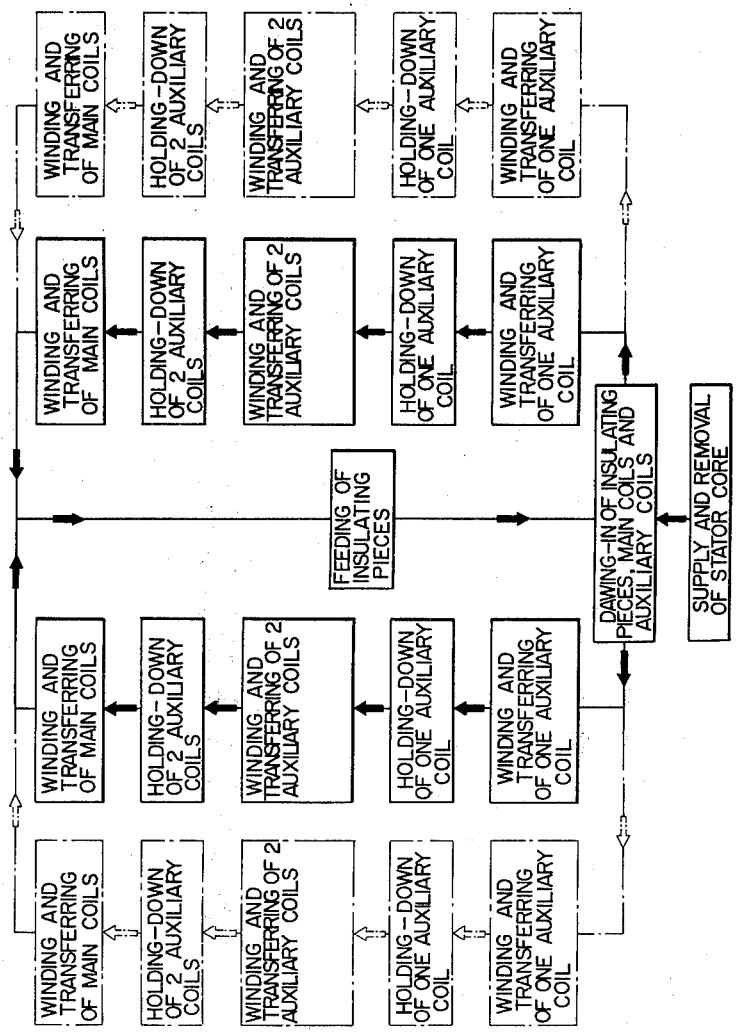

(5) The embodiment can be modified as shown in flow charts in FIGS. 40 and 41, for example.

The apparatus according to the invention offers the following advantages:

(1) The main coils and the auxiliary coils can be inserted in a stator core simultaneously in one operation with a high degree of efficiency, because the assembly line has arranged therealong a plurality of main coil winding devices and auxiliary coil winding devices located for cooperation with a drawing-in device which shorten the production time, and a transfer tool indexing device interposed between a plurality of the main coil winding devices and a plurality of the auxiliary coil winding devices for indexing the auxiliary coils with the main coils.

(2) The provision of a main coil holding-down step between the main coil winding step and an auxiliary coil winding step enables the height of the coils transferred to a transfer tool to be reduced, thereby making it possible to reduce the height of the blades and the insulator guides of the transfer tool to be reduced.

What is claimed is:

1. A method of fabricating stator assemblies for electrical machines on an automated assembly line, each of said stator assemblies having a stator core, main coils and auxiliary coils, said assembly line including a plurality of transfer tools each having a plurality of blades rotatably arranged thereon for carrying said main and auxiliary coils; a plurality of conveyors arranged in a closed loop for successively moving said plurality of transfer tools in one direction, said closed loop conveying path including a first main path having an inlet end, first branch paths extending from said first main path, a second main path merging said first branch paths, second branch paths extending from said second main path and a third main path merging said second branch paths and having a terminal end connected to the inlet end of said first main path; a plurality of main coil winding devices located along corresponding ones of said first branch paths a plurality of auxiliary coil winding devices located along corresponding ones of said second branch paths; and a drawing-in device positioned along said third main path for drawing said main and auxiliary coils into said stator core, said method comprising the steps of:

distributing selectively each of said transfer tools into a corresponding one of said main coil winding devices, said devices being in a stand-by state;

transferring at least one of said main coils to each of said transfer tools;

moving each of said transfer tools from its main coil winding device to merge said tools onto said second main path;

pushing said main coils into the bottom of each of said transfer tools;

indexing each of said transfer tools while on said second main path by rotating the blades therein;

distributing selectively each of said transfer tools into a corresponding one of said auxiliary coil winding devices, said devices being in a stand-by state;

transferring at least one of said auxiliary coils to each of said transfer tools;

moving each of said transfer tools from its auxiliary coil winding devices to merge said tools onto said third main path; and drawing in the main auxiliary coils carried by each of said transfer tools into said stator core, each of said stator assemblies being thereby fabricated by a single operation of said drawing-in device.

2. A device for fabricating stator assemblies of electrical machines, each of said stator assemblies having a stator core, main coils and auxiliary coils, comprising:

a closed loop conveying path having a plurality of conveyors arranged for successively moving transfer tools in one direction, each of said transfer tools having a plurality of blades rotatably arranged thereon for carrying said main and auxiliary coils, said closed loop conveying path including a first main path having an inlet end, first branch paths extending from said first main path, a second main path merging said first branch paths, second branch paths extending from said second main path, a third main path merging said second branch paths and having a terminal end connected to the inlet end of said first main path;

a plurality of main coil winding devices located along said respective first branch paths, each of said main coil winding devices winding at least one main coil and transferring said main coil to a corresponding transfer tool;

a transfer tool indexing device located along said second main path, said transfer tool indexing device indexing the blades of each of said transfer tools to selected positions where said auxiliary coils are to be inserted relative to the main coils previously transferred to said transfer tool; and a plurality of auxiliary coil winding devices located along each respective second branch paths, each of said auxiliary coil winding devices winding at least one auxiliary coil and transferring said auxiliary coil to a corresponding transfer tool.

3. A device for fabricating stator assemblies as set forth in claim 2, wherein said transfer tool indexing device comprises:
  stopper means for stopping the advancement of said transfer tool;
  means for pivotally moving said stopper means;
  means for lifting said transfer tool slightly away from said closed loop conveying path;
  a gear shaft, said gear shaft being rotationally and vertically movable and having upper and lower gears at the upper and lower ends thereof, respectively;
  means for moving said gear shaft axially;
  a rack meshing with said lower gear, said rack allowing said lower gear to move axially; and
  means for reciprocating said rack, whereby said upper gear is rotated and moved axially by the reciprocating movement of said rack and the axial movement of said gear shaft, respectively, and a gear mounted in each of said transfer tools, stopped by said stopper means, is rotated as said upper gear meshing with the gear of said transfer tool is rotated so as to index positions for inserting said auxiliary coils in relation to said main coils.

4. A device for fabricating stator assemblies as set forth in claim 3, which further comprises a main coil holdingdown device located along said second main path, said main coil holding-down device pushing said main coils into the bottom of each of said transfer tools.

5. A device for fabricating stator assemblies as set forth in claim 2, wherein said fabricating device further comprises:
  a first distributing means for distributing each of said transfer tools from said first main path to one of said first branch paths so as to selectively introduce each of said transfer tools to a corresponding main coil winding device, said main coil winding device being in a stand-by state;
  a first merging means for merging said transfer tools from said first branch paths, said first merging means driving said transfer tools to said second main path;
  a second distributing means for distributing each of said transfer tools from said second main path to one of said second branch paths so as to selectively introduce each of said transfer tool to a corresponding auxiliary coil winding devices, said auxiliary coil winding device being in a stand-by state; and
  second merging means for merging said transfer tools to said third main path.

6. A device for fabricating stator assemblies of electrical machines, each of said stator assemblies having a stator core, main coils and auxiliary coils comprising:
  a closed loop conveying path having a plurality of conveyors arranged for successively moving a plurality of transfer tools in one direction, each of said transfer tools having a plurality of blades rotatable arranged thereon for carrying said main and auxiliary coils;
  at least one main coil winding device for winding main coils and transferring said main coils to a corresponding transfer tool;
  at least one auxiliary coil winding device for winding auxiliary coils and transferring said auxiliary coils to a corresponding transfer tool;
  at least one auxiliary coil winding device for winding auxiliary coils and transferring said auxiliary coils to a corresponding transfer tool;

at least one transfer tool indexing device interposed between said main coil winding device and said auxiliary coil winding device, said transfer tool indexing device indexing the blades of each of said transfer tools to selected positions where said auxiliary coils are inserted relative to the main coils previously transferred to said transfer tool, and comprising:
    stopper means for stopping the advancement of said transfer tool,
    means for pivotally moving said stopper means,
    means for lifting said transfer tool slightly away from said closed loop conveying path,
    a gear shaft, said gear shaft being rotationally and vertically movable and having upper and lower gears at the upper and lower ends thereof, respectively,
    means for moving said gear shaft axially,
    a rack meshing with said lower gear, said rack allowing said lower gear to move axially, and
    means for reciprocating said rack, whereby said upper gear is rotated and moved axially by the reciprocating movement of said rack and the axial movement of said gear shaft, respectively, and a gear mounted in each of said transfer tools, stopped by said stopper means, is rotated as said upper gear meshing with the gear of said transfer tool is rotated so as to index positions for inserting said auxiliary coils in relation to said main coils; and
  at least one drawing-in device for simultaneously drawing said main coils and auxiliary coils into a stator core from a corresponding transfer tool.

7. A device for fabricating stator assemblies as set forth in claim 6, which further comprises at least one main coil holding-down device located along said second main path, said main coil holding-down device pushing said main coils into the bottom of each of said transfer tools.

8. A device for fabricating stator assemblies of electrical machines, each of said stator assemblies having a stator core, main coils and auxiliary coils, comprising:
  a closed loop conveying path having a plurality of conveyors arranged for successively moving transfer tools in one direction, each of said transfer tools having a plurality of blades rotatably arranged thereon for carrying said main and auxiliary coils, said closed loop conveying path including
    a first main path having an inlet end,
    first branch paths extending from said first main path,
    a second main path merging said first branch paths,
    second branch paths extending from said second main path,
    a third main path merging said second branch paths and having an outlet end, and
    a fourth main path having a receiving end connected to the outlet end of said third main path and having a terminal end connected to the inlet end of said first main path;
  a plurality of main coil winding devices located along said respective first branch paths, each of said main coil winding devices winding at least one main coil and transferring said main coil to a corresponding transfer tool;

a transfer tool indexing device located along said second main path, said transfer tool indexing device indexing the blades of each of said transfer tools to selected positions where said auxiliary coils are to be inserted relative to the main coils previously transferred to said transfer tool; and a plurality of auxiliary coil winding devices located along said respective second branch paths, each of said auxiliary coil winding devices winding at least one auxiliary coil and transferring said auxiliary coil to a corresponding transfer tool.

9. A device for fabricating stator assemblies as set forth in claim 8, wherein said closed loop conveying path comprises first and second sub-loop paths, each including said first main path, said first branch paths, said second main path, said second branch paths and said third main path, said first and second sub-loop paths being arranged in a parallel configuration; and means for joining said first and second sub-loop paths including means commonly connecting the outlet ends of said third main paths to the receiving end of said fourth main path and commonly connecting the inlet ends of said first main paths to the terminal end of said fourth main path.

10. A device for fabricating stator assemblies as set forth in claim 9, wherein said joining means comprises;

a pair of symmetrical pivotal arms respectively located along the outlet ends of said third main paths;

a pair of stoppers secured to corresponding ends of said pivotal arms, said stoppers stopping the transfer tools conveyed toward said joining means along the third main paths of said first and second sub-loop paths;

a connecting rod interconnecting said pair of pivotal arms, said connecting rod enabling simultaneous movement of said pivotal arms;

means for pivoting said pair of pivotal arms;

reversible drive rollers, the direction of rotation of said drive rollers depending on the direction from which the transfer tool approaches said joining means;

an elevating plate disposed beneath said drive rollers for moving the transfer tool slightly away from the surfaces of said drive rollers;

means for moving said elevating plate vertically;

claw means for advancing the transfer tool lifted by said elevating means; and means for displacing said claw means in a reciprocating movement, whereby said pair of pivotal arms are pivoted to successively actuate said stoppers to separate transfer tools coming from the main paths of said first and second sub-loop paths and alternately advancing the transfer tools to said elevating plate, the transfer tool on said elevating plate being lifted by said plate and moved by the reciprocating movement of said claw means for delivery to the receiving end of said fourth main path.

* * * * *